United States Patent
Gonzalez Aguirre et al.

(10) Patent No.: US 11,214,268 B2
(45) Date of Patent: Jan. 4, 2022

(54) METHODS AND APPARATUS FOR UNSUPERVISED MULTIMODAL ANOMALY DETECTION FOR AUTONOMOUS VEHICLES

(71) Applicant: Intel Corporation, Santa Clara, CA (US)

(72) Inventors: David I. Gonzalez Aguirre, Hillsboro, OR (US); Sridhar G. Sharma, Palo Alto, CA (US); Javier Felip Leon, Hillsboro, OR (US); Javier S. Turek, Beaverton, OR (US); Maria Soledad Elli, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 191 days.

(21) Appl. No.: 16/235,917

(22) Filed: Dec. 28, 2018

(65) Prior Publication Data
US 2019/0135300 A1 May 9, 2019

(51) Int. Cl.
*B60W 50/02* (2012.01)
*G05D 1/00* (2006.01)
(Continued)

(52) U.S. Cl.
CPC ....... *B60W 50/0205* (2013.01); *G05D 1/0088* (2013.01); *G06N 3/088* (2013.01);
(Continued)

(58) Field of Classification Search
CPC .............................................. B60W 50/0205
See application file for complete search history.

(56) References Cited

U.S. PATENT DOCUMENTS 8,996,224 B1 * 3/2015 Herbach .............. G05D 1/0044
701/23
10,156,848 B1 * 12/2018 Konrardy ............... G07C 5/006
(Continued)

FOREIGN PATENT DOCUMENTS

WO WO-2018126067 A1 * 7/2018 ............. G01S 17/90

OTHER PUBLICATIONS

Maddern, Will, et al., Real-time probabilistic fusion of sparse 3D LIDAR and dense stereo, 2016 IEEE/RSJ International Conference on Intelligent Robots and Systems (IROS), Daejeon Convention Center, Oct. 9-14, 2016, Daejeon, Korea (https://ieeexplore.IEEE.org/stamp/stamp.jsp?tp=&arnumber=7759342).*
(Continued)

*Primary Examiner* — Jean Paul Cass
(74) *Attorney, Agent, or Firm* — Hanley, Flight & Zimmerman, LLC

(57) ABSTRACT

An example includes obtaining first sensor data from a first sensor and second sensor data from a second sensor, the first sensor of a first sensor type different than a second sensor type of the second sensor; generating first encoded sensor data based on the first sensor data and second encoded sensor data based on the second sensor data; generating a contextual fused sensor data representation of the first and second sensor data based on the first and second encoded sensor data; generating first and second reconstructed sensor data based on the contextual fused sensor data representation; determining a deviation estimation based on the first and second reconstructed sensor data, the deviation estimation representative of a deviation between: (a) the first reconstructed sensor data, and (b) the first sensor data; and detecting an anomaly in the deviation estimation, the anomaly indicative of an error associated with the first sensor.

24 Claims, 13 Drawing Sheets

(51) Int. Cl.
  *G06N 20/00* (2019.01)
  *G06N 3/08* (2006.01)
(52) U.S. Cl.
  CPC ..... *G06N 20/00* (2019.01); *B60W 2050/0215* (2013.01); *G05D 2201/0213* (2013.01)

(56) References Cited

U.S. PATENT DOCUMENTS

| | | | |
|---|---|---|---|
| 10,162,355 B2* | 12/2018 | Hayon | G01C 21/165 |
| 10,185,998 B1* | 1/2019 | Konrardy | B60W 30/16 |
| 10,223,479 B1* | 3/2019 | Konrardy | B60W 30/16 |
| 10,324,463 B1* | 6/2019 | Konrardy | G01S 19/14 |
| 10,395,332 B1* | 8/2019 | Konrardy | G06F 16/90335 |
| 2006/0167784 A1* | 7/2006 | Hoffberg | G06Q 50/188 705/37 |
| 2007/0063875 A1* | 3/2007 | Hoffberg | G06Q 50/01 340/995.1 |
| 2010/0317420 A1* | 12/2010 | Hoffberg | G06Q 30/0282 463/1 |
| 2014/0201126 A1* | 7/2014 | Zadeh | A61B 5/165 706/52 |
| 2015/0353085 A1* | 12/2015 | Lee | B60W 30/12 701/533 |
| 2016/0170998 A1* | 6/2016 | Frank | H04W 4/021 707/748 |
| 2016/0191163 A1* | 6/2016 | Preston | H04B 10/2575 398/16 |
| 2016/0224803 A1* | 8/2016 | Frank | G06F 16/24578 |
| 2018/0018508 A1* | 1/2018 | Tusch | G06K 9/00771 |
| 2018/0188043 A1* | 7/2018 | Chen | G05D 1/0088 |
| 2018/0188372 A1* | 7/2018 | Wheeler | G06K 9/00825 |
| 2018/0188743 A1* | 7/2018 | Wheeler | G06F 16/9024 |
| 2018/0189578 A1* | 7/2018 | Yang | G06K 9/00798 |
| 2018/0204111 A1* | 7/2018 | Zadeh | G06K 9/3233 |
| 2018/0257661 A1* | 9/2018 | Kroop | G01S 17/86 |
| 2018/0370540 A1* | 12/2018 | Yousuf | B60W 50/023 |
| 2019/0135300 A1* | 5/2019 | Gonzalez Aguirre | G06N 3/088 |
| 2019/0139403 A1* | 5/2019 | Alam | H04W 4/40 |
| 2019/0225234 A1* | 7/2019 | Kumar | G06T 7/80 |
| 2019/0243371 A1* | 8/2019 | Nister | G05D 1/0231 |
| 2019/0258251 A1* | 8/2019 | Ditty | G06K 9/00805 |
| 2019/0258953 A1* | 8/2019 | Lang | G06N 5/003 |
| 2019/0265703 A1* | 8/2019 | Hicok | G06Q 50/30 |
| 2019/0302761 A1* | 10/2019 | Huang | G02B 27/017 |
| 2019/0303759 A1* | 10/2019 | Farabet | G06K 9/4628 |
| 2019/0371052 A1* | 12/2019 | Kehl | G06K 9/6256 |
| 2020/0057453 A1* | 2/2020 | Laws | B60W 10/20 |
| 2020/0059669 A1* | 2/2020 | Nishi | H04N 19/196 |
| 2020/0111011 A1* | 4/2020 | Viswanathan | H04N 17/002 |
| 2020/0175744 A1* | 6/2020 | Rosenzweig | H04N 19/20 |
| 2020/0184278 A1* | 6/2020 | Zadeh | G06F 16/953 |
| 2020/0189591 A1* | 6/2020 | Mellinger, III | B60W 60/0051 |
| 2020/0200547 A1* | 6/2020 | Miller | G08G 1/096805 |
| 2020/0202167 A1* | 6/2020 | Gross | G06K 9/6227 |
| 2020/0202168 A1* | 6/2020 | Mao | G06K 9/6292 |
| 2020/0202706 A1* | 6/2020 | Chaves | G08G 1/0112 |
| 2020/0207371 A1* | 7/2020 | Dougherty | G08G 1/166 |
| 2020/0218908 A1* | 7/2020 | Lee | G06K 9/4661 |
| 2020/0218913 A1* | 7/2020 | Unnikrishnan | G06K 9/6218 |
| 2020/0219316 A1* | 7/2020 | Baik | G05D 1/0251 |
| 2020/0225032 A1* | 7/2020 | Chen | G06T 7/68 |
| 2020/0225655 A1* | 7/2020 | Cella | G06N 3/0472 |

OTHER PUBLICATIONS

Akhtar et al., "Threat of Adversarial Attacks on Deep Learning in Computer vision: A Survey," IEEE Access, vol. 6, Feb. 19, 2018, pp. 14410-14430 (21 pages).

H. H. Bosman et al., "Spatial Anomaly Detection in Sensor Networks Using Neighborhood Information," Information Fusion, vol. 33, pp. 41-56. Available online Apr. 26, 2016 <URL: https://www.sciencedirect.com/science/article/pii/S1566253516300252> (16 pages).

Charte et al., "A Practical Tutorial on Autoencoders for Nonlinear Feature Fusion: Taxonomy, Models, Software and Guidelines," Information Fusion, vol. 44, pp. 78-96. Available online Dec. 23, 2017 <URL: https://doi.org/10.1016/j.inffus.2017.12.007> (19 pages).

Eykholt et al., "Robust Physical-World Attacks on Deep Learning Visual Classification," IEEE Conference on Computer Vision and Pattern Recognition (CVPR), 2018. Available online Apr. 10, 2018 <URL: https://arxiv.org/pdf/1707.08945.pdf> (11 pages).

Moosavi-Dezfooli et al., "Universal Adversarial Perturbations," 2017 IEEE Conference on Computer Vision and Pattern Recognition (CVPR), 2017 (9 pages).

Papernot et al., "Practical Black-Box Attacks against Machine Learning," Proceedings of the 2017 ACM Asia Conference on Computer and Communications Security, 2017. Available online Mar. 19, 2017 <URL: https://arxiv.org/pdf/1602.02697.pdf> (14 pages).

Rifai et al., "A Generative Process for Sampling Contractive Auto-Encoders," Proceedings of the 29th International Conference on Machine Learning, Edinburgh, Scotland, 2012 (8 pages).

Su et al., "One Pixel Attack for Fooling Deep Neural Networks," In CoRR (Computing Research Repository) [online], Feb. 22, 2018. Retrieved from the Internet: <URL: http://arxiv.org/abs/1710.08864> (11 pages).

Park et al., "Multimodal Execution Monitoring for Anomaly Detection During Robot Manipulation," IEEE International Conference on Robotics and Automation (ICRA), 2016 (8 pages).

Kameswari et al., "Sensor Data Analysis and Anomaly Detection using Predictive Analytics for Process Industries," IEEE Workshop on Computational Intelligence: Theories, Applications and Future Directions, Kanpur, India, Dec. 14-17, 2015 (8 pages).

* cited by examiner

METHODS AND APPARATUS FOR UNSUPERVISED MULTIMODAL ANOMALY DETECTION FOR AUTONOMOUS VEHICLES

FIELD OF THE DISCLOSURE

This disclosure relates generally to computer processing in vehicles, and more specifically to methods and apparatus for unsupervised multimodal anomaly detection for autonomous vehicles.

BACKGROUND

Autonomous vehicles, or self-driving vehicles, use multiple sensors to acquire information about the surrounding areas in which those vehicles navigate. Computers analyze the sensor data from such multiple sensors to make decisions regarding speed, braking, maneuvers, traction handling, external lighting requirements, etc. Autonomous vehicles are often provided with different types of sensors to detect objects under different types of environmental conditions.

Figure 1:
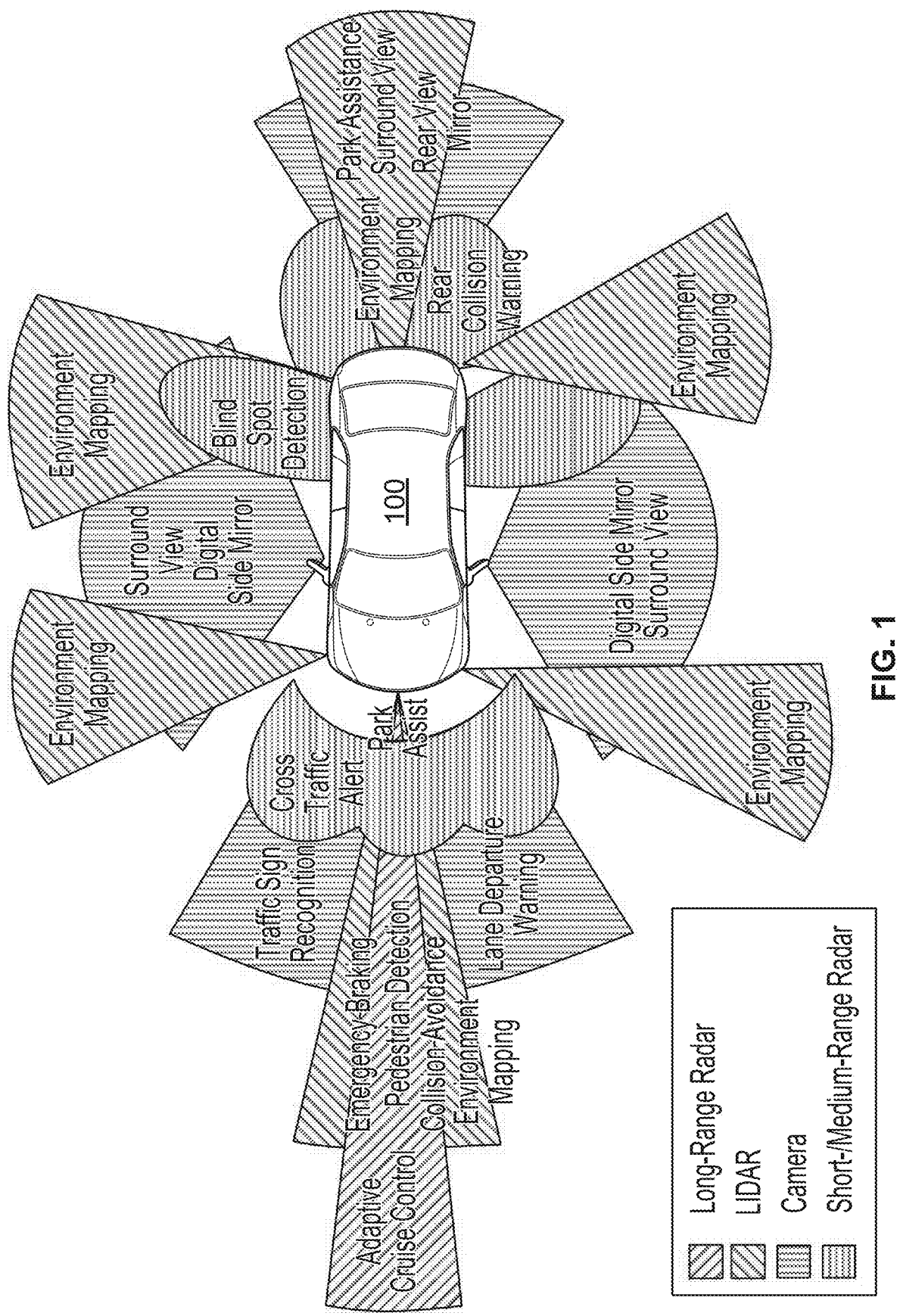
FIG. 1 illustrates example usages of a heterogeneous sensor configuration in an autonomous vehicle.

Wherever possible, the same reference numbers are used throughout the drawing(s) and accompanying written description to refer to the same or like parts. Connecting lines or connectors shown in the various figures presented are intended to represent example functional relationships and/or physical or logical couplings between the various elements.

DETAILED DESCRIPTION

Autonomous robotic systems such as autonomous vehicles use multiple cameras as well as range sensors to perceive characteristics of their environments. The different sensor types (e.g., infrared (IR) sensors, red-green-blue (RGB) color cameras, Light Detection and Ranging (LIDAR) sensors, Radio Detection and Ranging (RADAR) sensors, SOund Navigation And Ranging (SONAR) sensors, etc.) can be used together in heterogeneous sensor configurations useful for performing various tasks of autonomous vehicles. For example, FIG. 1 shows an example autonomous vehicle 100 and example usages of a heterogeneous sensor configuration of the autonomous vehicle 100. The performances of these sensors are affected differently under diverse environmental conditions. Such inconsistent performance across different environment conditions makes it difficult (in some cases impossible) to detect anomalous outputs of the sensors using prior techniques. In some instances, anomalies could be the result of either hardware or software failures or adversarial attacks targeted at the autonomous systems.

In autonomous robotic applications such as autonomous vehicle operation, redundant sensors can be employed to safely drive under a variety of environmental conditions. An anomaly (e.g., due to a hardware failure, a software failure, or an adversarial attack) can jeopardize the safe operation of the autonomous system. Examples disclosed herein enable unsupervised multimodal anomaly detection for autonomous vehicles and/or any other type of autonomous system. For example, examples disclosed herein enable an autonomous system to qualitatively and/or quantitatively detect deviations of sensor data from an expected norm and/or detect other complex and/or uncommon behaviors of multiple types of sensors through probabilistic modeling and feature fusion in latent space using unsupervised deep neural auto-encoding systems. Unsupervised multimodal anomaly detection examples disclosed herein integrate sensor data (e.g., in a seamless manner) collected from sensor signals of a heterogeneous sensor configuration to evaluate the consistency, stability, and/or quality of the information provided by each sensor. Examples disclosed herein leverage sensor redundancy of autonomous vehicles to detect anomalous behavior represented in sensor data and determine a level of confidence for each sensor at different points in time. In some examples, such anomaly detection and confidence level assessments for multiple sensors can be performed simultaneously. In this manner, a processing system for an autonomous vehicle can make quick decisions (e.g., split-second decisions) during operation of the autonomous vehicle by considering whether sensor data is providing anomalous information or non-anomalous information.

As used herein, an anomaly occurs when a first environmental characteristic represented in first sensor data from a first sensor of an autonomous vehicle deviates beyond a threshold from a reconstructed version of the first sensor data after performing encoding, aggregating, fusing, and decoding processes on the first sensor data in accordance with teachings of this disclosure. When an anomaly occurs, the contributing sensor data is regarded as providing anomalous information because the sensor data is abnormal when considered relative to a whole-scene sensor-based representation of an environment. The anomalous information leading to the detection of an anomaly is abnormal information in that it is not within a normal range or is not commensurate with sensor data of one or more other sensors of the autonomous vehicle. That is, examples disclosed herein use the one or more other sensors as redundant to the first sensor for purposes of anomaly detection. When one or more redundant sensors more consistently and/or accurately characterize the same environmental aspect that is mis-characterized by the first sensor, the first sensor is regarded as an anomalous sensor. For example, imaging sensor data from a rear-view camera of an autonomous vehicle may report an obstruction, thus preventing the autonomous vehicle from backing up. However, unsupervised multimodal anomaly detection examples disclosed herein can determine that the rear-view camera is anomalous when the rear-view camera exhibits abnormal characteristics relative to a whole-scene representation generated based on other sensors such as a rear-facing RADAR sensor. This may be the case when the obstruction detected by the rear-view camera is operating or sensing abnormally due to, for example, a leaf obstructing the camera field of view, dirt on the camera lens, a crack in the camera lens, a malfunctioning imaging sensor of the camera, etc.

In the heterogeneous sensor configuration of FIG. 1, the autonomous vehicle 100 is provided with camera sensors, RADAR sensors, and LIDAR sensors. Cameras are high resolution image sensors that can detect both shape and texture (e.g., road markings, traffic sign text, traffic light color, road conditions, etc.). Visible light cameras work well in illuminated conditions but sometimes do not work as well under less-illuminated conditions (e.g., at night, in dark parking garages, etc.) or under other challenging weather conditions (e.g., low-visibility fog, rain, snowfall, dust storms, etc.). On the other hand, LIDAR sensors work well in almost all light conditions but their performance decreases in the presence of dust, mist, snow, fog and rain. However, although LIDAR sensor technology adapts better to all lighting conditions than visible light camera technology, LIDAR sensors have lower resolution than cameras. RADAR sensors are able to sense through fog and can measure both distance and velocity of moving objects (using Doppler frequency shift). An advantage of RADAR over LIDAR is that electromagnetic waves produced by RADAR have lower absorption by objects than light produced by LIDAR sensors. As such, RADAR sensors can work over longer distances than LIDAR sensors. Unfortunately, RADAR technology offers significantly lower resolution than other sensors due to its power and bandwidth limitations. SONAR sensors use ultrasound for near-field sensing which complements RADAR and LIDAR technologies. That is, while RADAR and LIDAR technologies can be used for long-distance object detection, SONAR technology can be used for short-distance object detection. In addition, SONAR sound waves can travel through transparent objects such as glass.

Figure 2:
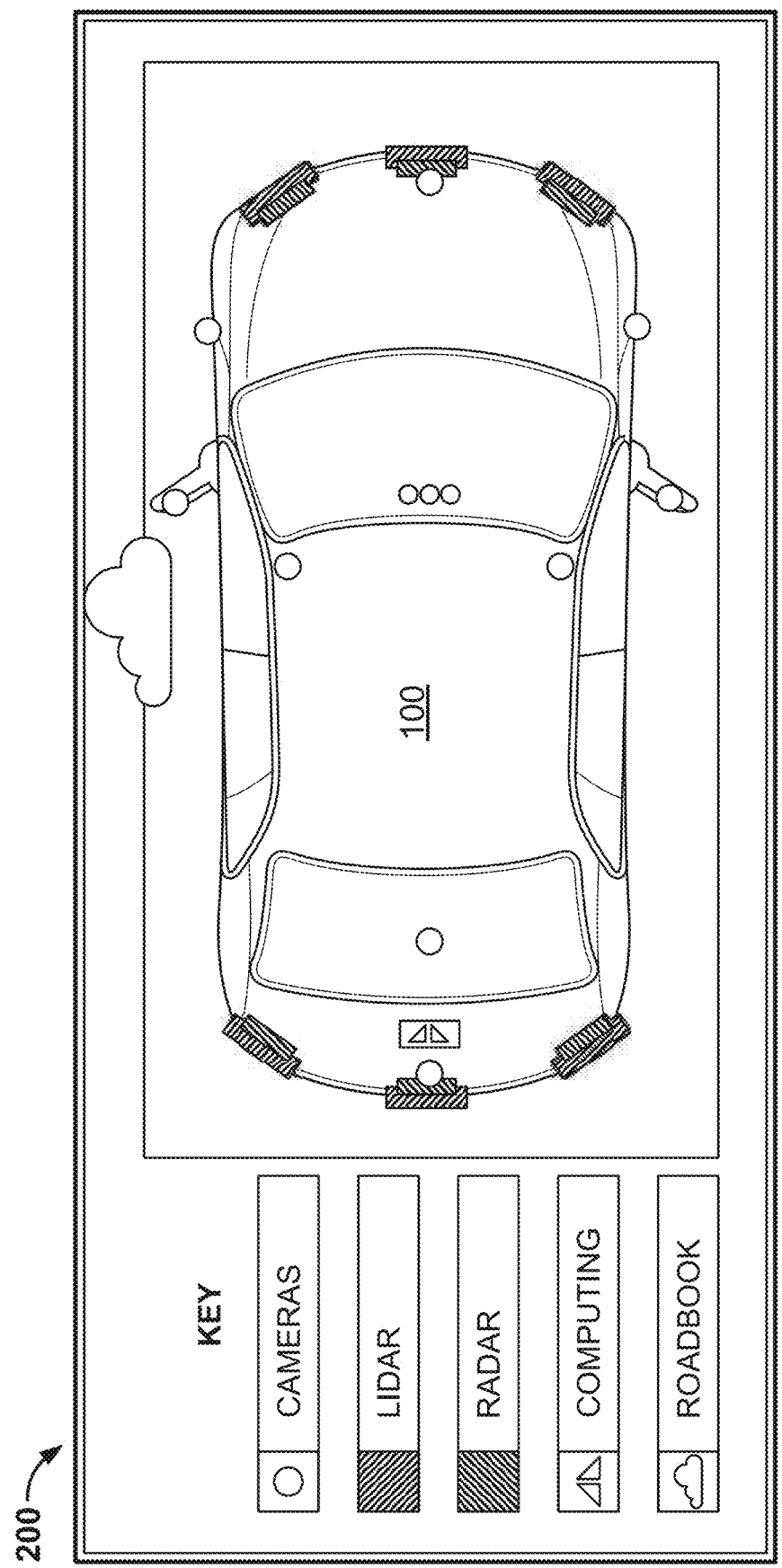
FIG. 2 illustrates an example heterogeneous sensor placement configuration in the autonomous vehicle of FIG. 1.

FIG. 2 illustrates an example heterogeneous sensor placement configuration 200 in the autonomous vehicle 100 of FIG. 1. In the illustrated example of FIG. 2, there are 12 cameras 202 in a 360-degree configuration on the autonomous vehicle 100. Eight of those cameras 202 support near-field sensing. In some examples, the cameras 202 include multiple types of cameras such as visible light cameras, thermal cameras, and/or infrared cameras. Visible light cameras perceive fields of view similar to human vision. Thermal cameras perceive fields of view based on temperature such that a human being, an animal, a warm operating vehicle, etc. produce heat signatures relative to other surrounding objects. Infrared cameras can perceive fields of view in dark or low-light environments in which visible light cameras are less effective.

The autonomous vehicle 100 also includes six total sector LIDAR sensors 204 in which a sector is a field of detection. Three of the LIDAR sensors 204 are located at the front of the autonomous vehicle 100, and three are located at the rear. The autonomous vehicle 100 is also provided with six RADAR sensors 206 that include a mix of short-range and long-range detection capabilities, providing 360-degree coverage around the autonomous vehicle 100. In some examples, the autonomous vehicle 100 is also provided with SONAR sensors. In the illustrated example of FIG. 2, the LIDAR sensors 204, the RADAR sensors 206, and SONAR sensors are used as redundant sensors for the camera sensors 202. An advantage of the cameras 202 is that they have high image resolution. Thus, the cameras 202 offer a view of surrounding environments in a similar way as humans perceive such surroundings. The LIDAR sensors 204, the RADAR sensors 206, and SONAR sensors provide low-resolution point clouds (e.g., mosaics or aggregations of data point values the represent a depth-based rendering of the perceived environment) that are fused together to create a 3D representation of the environment. As such, the heterogeneous sensor placement configuration 200 of FIG. 2 provides the autonomous vehicle 100 with two sets of redundant sensors that include primary sensors in the form of the cameras 202 and the secondary sensors in the form of the LIDAR sensors 204, the RADAR sensors 206, and the SONAR sensors.

Examples disclosed herein may employ redundant heterogeneous sensor configurations such as the heterogeneous sensor placement configuration 200 of FIG. 2 to implement high-dimensional feature fusion that works independent of the types of sensors and/or independent of specific data formats by using unsupervised machine learning. In the context of dimensionality of data that represents features in input data, dimension, dimensional, and dimensionality refer to a size in elements for representing features in the input data. That is, the number of dimensions for a feature refers to the size of the feature container such as the size of a vector or a matrix that includes values representing the feature. For example, techniques disclosed herein process input data (e.g., sensor data) from multiple sensors the same way and re-arrange the input data in the same manner on the basis that each element of a feature is considered as a separate dimension of a plurality of dimensions of that feature. Examples disclosed herein use such multi-dimensional characteristics of feature data to perform feature aggregation across multiple sensors on a dimension-per-dimension basis. For example, if a feature is described using values in an array of size [1×128], that feature is described with a feature vector of 128 dimensions, and examples disclosed herein aggregate each dimension separately. This enables fusing sensor data from multiple sensors and/or multiple types of sensors at the dimension level so that anomaly analyses and detection can be performed across an environment monitored using multiple different types of sensors. As such, unsupervised multimodal anomaly detection techniques for autonomous vehicles disclosed herein are not limited to use with particular types of sensors or particular types of data structure for representing environmental characteristics. This is advantageous over prior techniques designed for analyzing sensor data from homogeneous sensor type configurations (configurations of multiple sensors of the same type), specific quantities of sensors and actuators, specific signal structures, and specific routines that are specifically developed for a particular task and environment. Examples disclosed herein may be flexibly implemented across heterogeneous sensor configurations in which the quantity of sensors can vary over time. For example, in the autonomous vehicle 100 of FIGS. 1 and 2, one or more sensors may drop out or malfunction over time. In such situations, examples disclosed herein are sufficiently unaffected by such changes in sensor operation by virtue of recognizing such changes as anomalous and taking such anomalous activity into account to not produce unexpected or abnormal operation of the autonomous vehicle 100 that is inconsistent with the actual environmental conditions in which the autonomous vehicle 100 is operating.

By recognizing anomalous situations, examples disclosed herein are not hindered by disadvantages of prior solutions which include restriction to only predefined sensors in amount and type, lack of broad deployment potential due to the explicit or implicit supervised approach while training models or while fitting model parameters, lack of context-invariant confidence value estimates per sensor and per scenario, dependency to sensing specific environment using fixed positions and fixed orientations of sensors, lack of generalized and optimized leveraging of mutual sensors' fields of view that overlap to establish robust signal-context fusion representations for determining confidence metrics based on multiple device outputs, and lack of computational parallelization, and compactness limitations. The property of compactness refers to the reduced size of encoding or representation of a scene performed by a neuro-encoder (e.g., an auto-encoder). With improved compactness, an entire scene and large redundant masses of information are spatially efficiently encoded. Examples disclosed herein exhibit better compactness than prior techniques of analyzing sensor data because they enable more meaningful computation, communication, and storage of high-density features.

Examples disclosed herein create and use a fused content representation of multiple heterogeneous signals from multiple redundant heterogeneous sensors. Examples disclosed herein leverage the implicit unified spatial context and visual context in the fused content representation to enable autonomous vehicles to determine when, how, and which sensor(s) is/are behaving abnormally.

An example advantage of examples disclosed herein over prior techniques is that examples disclosed herein leverage unsupervised learning by using sparse convolutional auto-encoders that preserve various structural properties of input sensor data. These sparse convolutional auto-encoders have compact, injective, and quasi-subjective properties. They can detect inconsistencies in the sensor state to leverage structural metric properties of input sensor data independent of the scene or physical space that the input sensor data represents. Examples disclosed herein enable determining the sensor, the timestamp, and a normalized numerical score of deviation when an anomaly is detected (e.g., a malfunction of a sensor, an attack on the system, etc.). The confidence score enriches the data to be analyzed by probabilistic inference algorithms in multiple tasks such as motion planning which is a part of an autonomous driving stack (e.g., the autonomous driving apparatus 300 of FIG. 3) and other decision-making algorithms, thus, enabling the blending of probabilistically optimized information and analysis thereof. In addition, unsupervised learning makes examples disclosed herein substantially invariant to specific structures or visual conditions of the environment. As such examples disclosed herein are suitable for deployment across a large variety of road systems in multiple countries or even across a variety of natural places (e.g., off-road environments).

Figure 3:
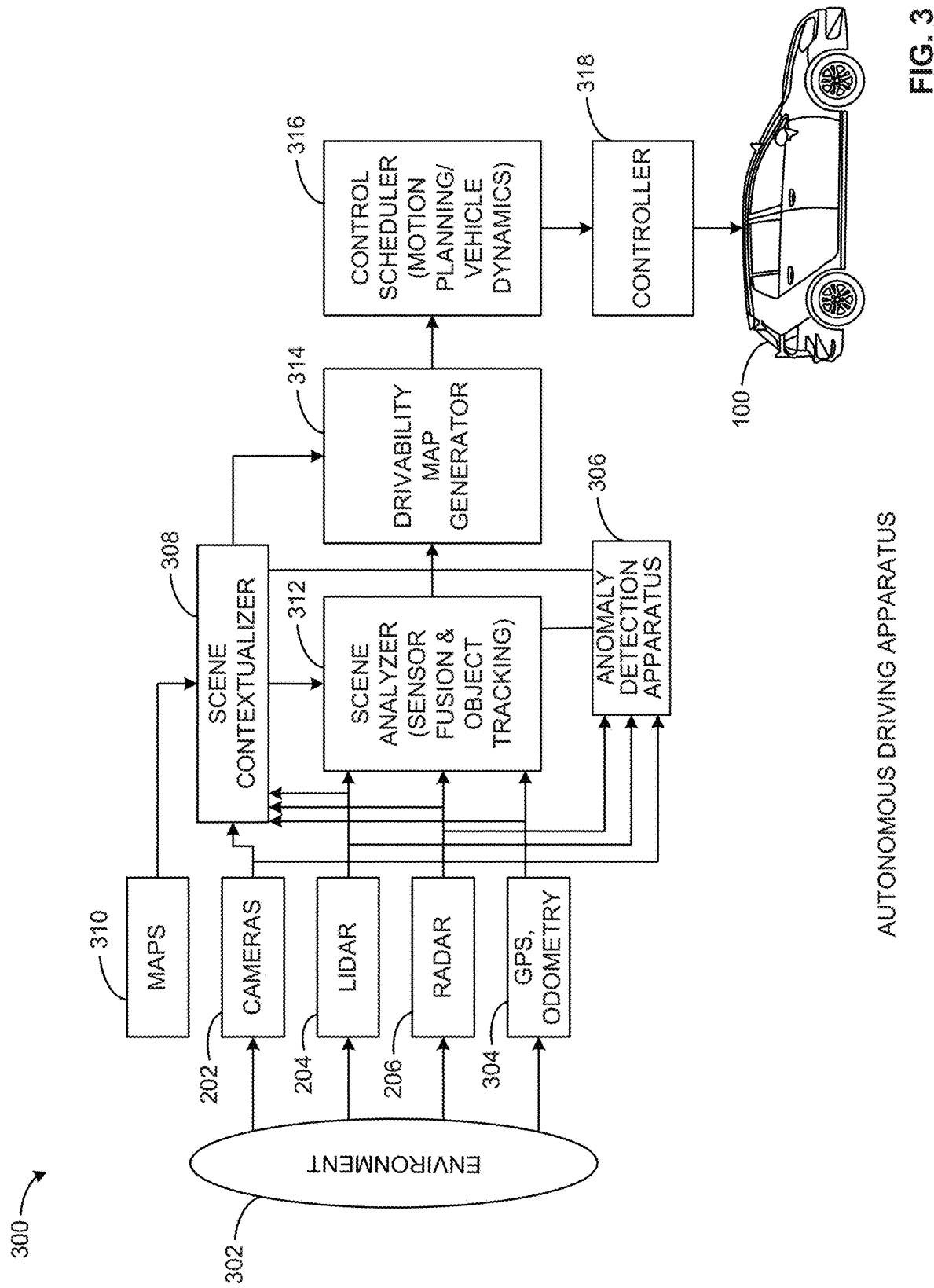
FIG. 3 is an example autonomous driving stack of the autonomous vehicle of FIGS. 1 and 2.

FIG. 3 is an example autonomous driving apparatus 300 of the autonomous vehicle 100 of FIGS. 1 and 2. The example autonomous driving apparatus 300 represents operational components that execute as part of operating the autonomous vehicle 100 to collect sensor data, process the sensor data, and analyze the sensor data as disclosed herein to detect anomalies in the sensor data and control operations of the autonomous vehicle 100. In some examples, the autonomous driving apparatus 300 may be implemented as an autonomous driving stack.

In the illustrated example, the autonomous driving apparatus 300 collects sensor data corresponding to characteristics of an environment 302 via the camera sensors 202, the LIDAR sensors 204, and/or the RADAR sensors 206 of FIG. 2. In the illustrated example, the autonomous driving apparatus 300 may additionally or alternatively collect sensor data from one or more other sensors 304 (e.g., a global positioning system (GPS) sensor, an odometer, etc.) of the autonomous vehicle 100.

The example autonomous driving apparatus 300 of FIG. 3 is provided with an anomaly detection apparatus 306 to create and analyze a fused content representation of the environment 302 based on multiple heterogeneous signals from multiple redundant heterogeneous sensors. Based on the fused content representation, the example anomaly detection apparatus 306 performs unsupervised multimodal anomaly detection to facilitate operation of the autonomous vehicle 100. For example, analyses performed by the anomaly detection apparatus 306 can be used to determine when, how, and which sensor(s) is/are behaving abnormally so that sensor data from such sensor(s) can be ignored and/or supplemented by data from one or more other sensor(s) to control operation of the autonomous vehicle 100. The example anomaly detection apparatus 306 is described in greater detail below in connection with FIG. 4.

The example autonomous driving apparatus 300 is provided with an example scene contextualizer 308 to implement scene understanding. Through scene understanding, the scene contextualizer 308 generates location-based context awareness for the autonomous vehicle 100 based on sensor data from one or more of the sensors 202, 204, 206, 304 and map information from an example maps data interface 310. For example, the scene contextualizer 308 determines geospatial information about the autonomous vehicle 100 such as geographic location, positioning, orientation, etc. For example, the scene contextualizer 308 receives map information from the example maps data interface 310 and GPS location coordinates from a GPS sensor interface 304 to identify a street/road position of the autonomous vehicle 100. The maps data interface 310 may obtain map information from a server via a network and/or from a local data store so that the scene contextualizer 308 can associate GPS location coordinates to street-level map locations in the map information. The scene contextualizer 308 can also obtain sensor data from others of the sensors 202, 204, 206, 304 to assess characteristics of the environment 302 to better understand exact positioning (e.g., street corner location, left/right-side street positioning, street-shoulder positioning, etc.) at a geographic location. The scene contextualizer 308 can also determine orientation such as facing direction of the autonomous vehicle 100 based on sensor data from others of the sensors 202, 204, 206, 304.

The example autonomous driving apparatus 300 is provided with an example scene analyzer 312 that performs sensor fusion and object tracking. For example, the scene analyzer 312 performs scene analyses on combinations of sensor data from one or more of the sensors 202, 204, 206, 304 relative to scene context information from the scene contextualizer 308. For example, the scene analyzer 312 can identify surface conditions (e.g., wet, gravel, dirt, etc.), weather conditions (e.g., rain, snow, hail, sleet, etc.), lighting conditions (e.g., night, day, lighted/dark tunnel, lighted/dark parking garage, etc.) of the environment 302 relative to geographic location, positioning, and orientation from the scene contextualizer 308. The example scene analyzer 312 can track objects in the environment 302 such as other vehicles, pedestrians, animals, and/or other objects that affect travel of the autonomous vehicle 100.

In the illustrated example, the scene contextualizer 308 and the scene analyzer 312 are in communication with the anomaly detection apparatus 306 to receive anomaly information from the anomaly detection apparatus 306. In this manner, the scene contextualizer 308 and the scene analyzer 312 can perform their operations by taking into account anomalous information present in the sensor data collected from the sensors 202, 204, 206, 304. For example, the scene contextualizer 308 may use the anomaly information from the anomaly detection apparatus 306 and the scene analyzer 312 to ignore anomalous information and/or replace the anomalous information with reliable information from sensor data of one or more non-anomalous sensors.

The example autonomous driving apparatus 300 is provided with an example drivability map generator 314 to identify acceptable or safe paths of travel based on information from the scene contextualizer 308 and an example object tracker module in the scene analyzer 312. The example object tracker module estimates kinematics and trajectories for dynamic objects in the environment 302. Based on locations of static objects and the trajectories of the dynamic objects, the example drivability map generator 314 can estimate available free space. The identified free space surrounding the autonomous vehicle 100 is the path that can be travelled by the autonomous vehicle. If the scene contextualizer 308 and/or the scene analyzer 312 identify a pedestrian or another vehicle, for example, in any direction, the drivability map generator 314 updates navigation path information to indicate that travel is not permitted in the direction of the pedestrian or other vehicle.

The example autonomous driving apparatus 300 is provided with an example control scheduler 316 to generate motion planning control information and/or vehicle dynamics control information. For example, based on information from the drivability map generator 314, the control scheduler 316 can generate maneuver control information for the autonomous vehicle 100 and schedule such maneuvering. Example motion planning performed by the control scheduler 316 includes driving direction such as forward driving, left turning, right turning, backing up, northward driving, southward driving, eastward driving, westward driving, etc. Example vehicle dynamics information can include breaking, traction control (e.g., for different surface conditions, weather conditions, etc.), suspension settings (e.g., based on surface conditions, traffic conditions, city driving vs. highway driving, etc.), and/or any other types of vehicle dynamics.

The example autonomous driving apparatus 300 is provided with an example controller 318 to implement the motion planning control information and/or vehicle dynamics control information from the control scheduler 316 for operation of the autonomous vehicle 100. The example controller 318 is in communication with actuators, motors, switches, lights, and/or any other electrical, mechanical, and/or electromechanical components of the autonomous vehicle 100 to implement motion and vehicle dynamics.

Figure 4:
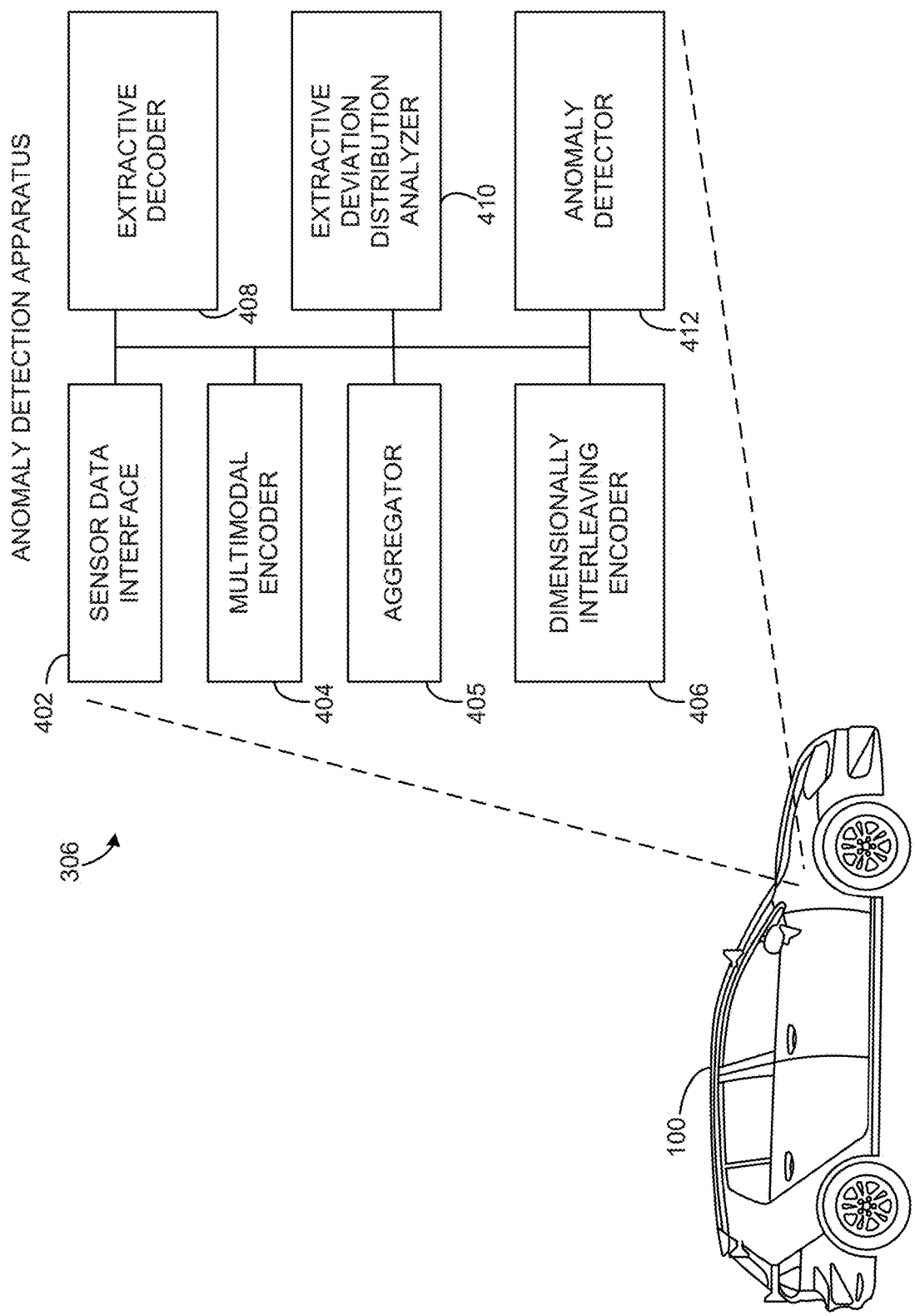
FIG. 4 is a block diagram of the example anomaly detection apparatus of FIG. 3 for unsupervised multimodal anomaly detection for autonomous vehicles in accordance with teachings of this disclosure.

FIG. 4 is a block diagram of the example anomaly detection apparatus 306 of FIG. 3 that may be used to implement unsupervised multimodal anomaly detection for the autonomous vehicle 100. The example anomaly detection apparatus 306 includes an example sensor data interface 402, an example multimodal encoder 404, an example aggregator 405, an example dimensionally interleaving encoder 406, an example extractive decoder 408, an example extractive deviation distribution analyzer 410, and an example anomaly detector 412.

The anomaly detection apparatus 306 is provided with the example sensor data interface 402 to collect raw sensor data ($Ii(x,y,t)$) from one or more of the sensors 202, 204, 206, 304 of FIGS. 2 and 3. For example, the configuration of the sensors 202, 204, 206, 304 is a heterogeneous configuration in which the sensors 202, 204, 206, 304 are of different types. In such heterogeneous configuration, the sensor data interface 402 can, for example, obtain first collected sensor data from a first one of the sensors 202, 204, 206, 304 and second collected sensor data from a second one of the sensors 202, 204, 206, 304, in which the first one of the sensors 202, 204, 206, 304 is of a first sensor type different than a second sensor type of the second one of the sensors 202, 204, 206, 304. In some examples, the first collected sensor data and the second collected sensor data may be from different ones of camera data, LIDAR data, RADAR data, and/or SONAR data that represent 2D (x,y) images and/or 3D (x,y,z) images.

Figure 6:
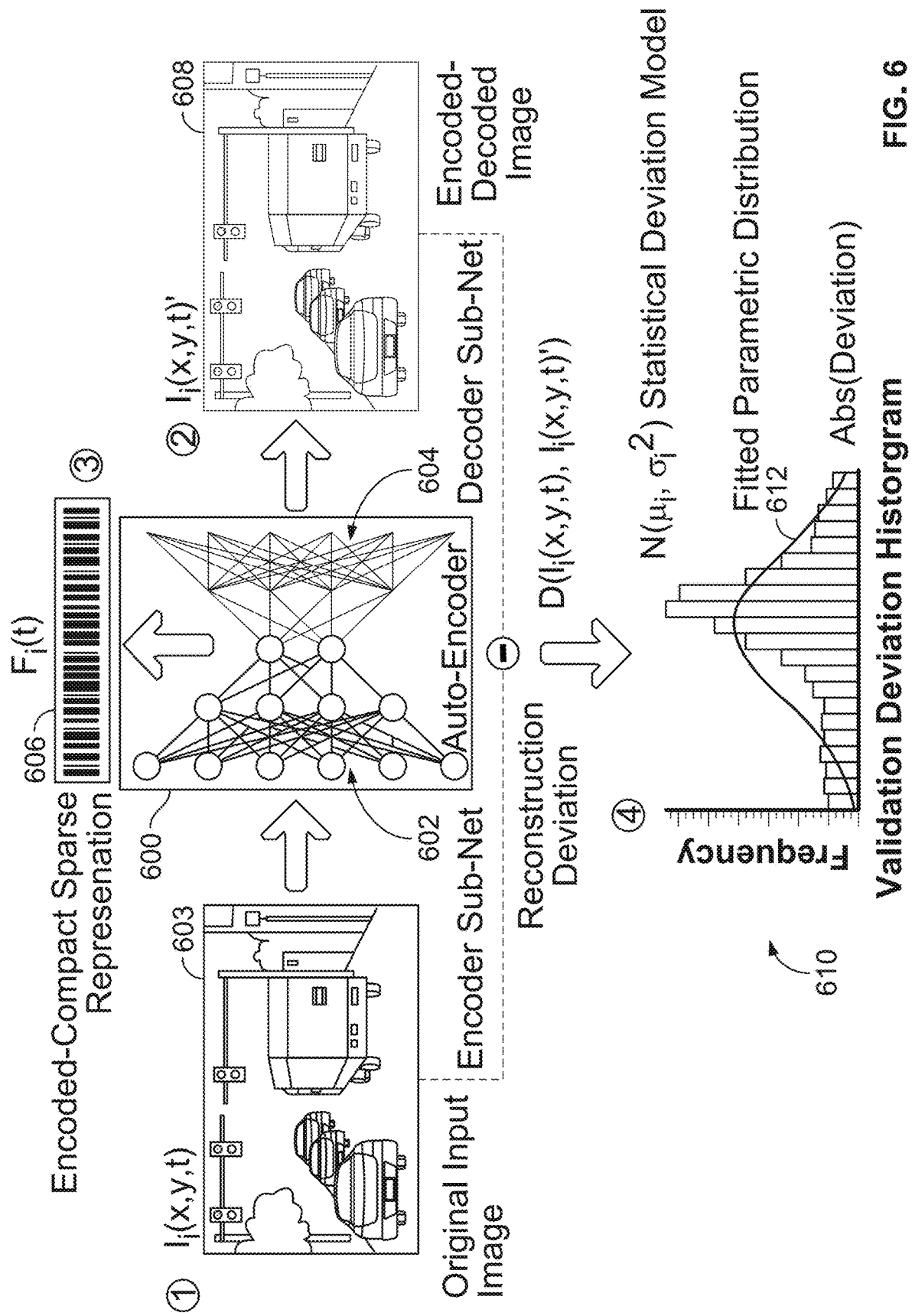
FIG. 6 illustrates an example auto-encoder for use in performing anomaly detection in accordance with teachings of this disclosure.

The anomaly detection apparatus 306 is provided with the example multimodal encoder 404 to convert collected raw sensor data to encoded sensor data (e.g., the encoded-compact sparse sensor data representation ($Fi(t)$) 606 of FIG. 6) represented as, for example, an array or vector for a particular time (t) at which the raw sensor data was collected. For example, the multimodal encoder 404 can generate first encoded sensor data based on first collected sensor data collected by the sensor data interface 402 in a multi-dimensional format and second encoded sensor data based on second collected sensor data collected by the sensor data interface 402 in a multi-dimensional format. Examples of the multimodal encoder 404 converting multi-dimensional sensor data to encoded sensor data are described below in connection with FIG. 7. In the illustrated example, the multimodal encoder 404 is referred to as multimodal because it encodes sensor data of different modalities. In this context, modalities refers to different types of sensors (e.g., camera sensors, LIDAR sensors, RADAR sensors, SONAR sensors, etc.).

The anomaly detection apparatus 306 is provided with the example aggregator 405 to generate a contextual aggregated sensor data representation (e.g., the contextual aggregated sensor data representation 710) of collected raw sensor data based on the encoded sensor data generated by the multimodal encoder 404. For example, the aggregator 405 stacks the encoded sensor data generated by the multimodal encoder 404 to generate the contextual aggregated sensor data representation. The anomaly detection apparatus 306 is provided with the example dimensionally interleaving encoder 406 to generate a contextual fused sensor data representation of collected raw sensor data. For example, the dimensionally interleaving encoder 406 can generate a contextual fused sensor data representation of the first and second collected sensor data collected by the sensor data interface 402 based on the contextual aggregated sensor data representation generated by the aggregator 405. Examples of the dimensionally interleaving encoder 406 generating a contextual fused sensor data representation of sensor data are described below in connection with FIGS. 7 and 9.

The anomaly detection apparatus 306 is provided with the example extractive decoder 408 to generate reconstructed sensor data based on the contextual fused sensor data representation generated by the dimensionally interleaving encoder 406. For example, the extractive decoder 408 can generate first reconstructed sensor data corresponding to the first collected sensor data from a first one of the sensors 202, 204, 206, 304, and can generate second reconstructed sensor data corresponding to the second collected sensor data from a second one of the sensors 202, 204, 206, 304, in which the first one of the sensors 202, 204, 206, 304. Generating of the reconstructed sensor data is described further below in connection with FIG. 7.

The anomaly detection apparatus 306 is provided with the example extractive deviation distribution analyzer 410 to determine probabilistic deviation estimations representative of likelihoods of deviations between expected sensor data and actual collected sensor data. For example, the extractive deviation distribution analyzer 410 can determine probabilistic deviation estimations based on the first and second reconstructed sensor data decoded by the extractive decoder 408 and corresponding ones of the first and second collected sensor data. In such examples, the probabilistic deviation estimation is representative of likelihoods of deviations between: (a) the first reconstructed sensor data, and (b) the first collected sensor data collected by the sensor data interface 402 from the first one of the sensors 202, 204, 206, 304. Examples of the extractive deviation distribution analyzer 410 determining a probabilistic deviation estimation are described below in connection with FIG. 7.

The anomaly detection apparatus 306 is provided with the example anomaly detector 412 to detect anomalies represented in collected sensor data. For example, the anomaly detector 412 can detect an anomaly in the probabilistic deviation estimation generated by the extractive deviation distribution analyzer 410. In such examples, the anomaly is indicative of an error in the operation of the first one of the sensors 202, 204, 206, 304 from which the sensor data interface 402 collected sensor data.

Figure 5:
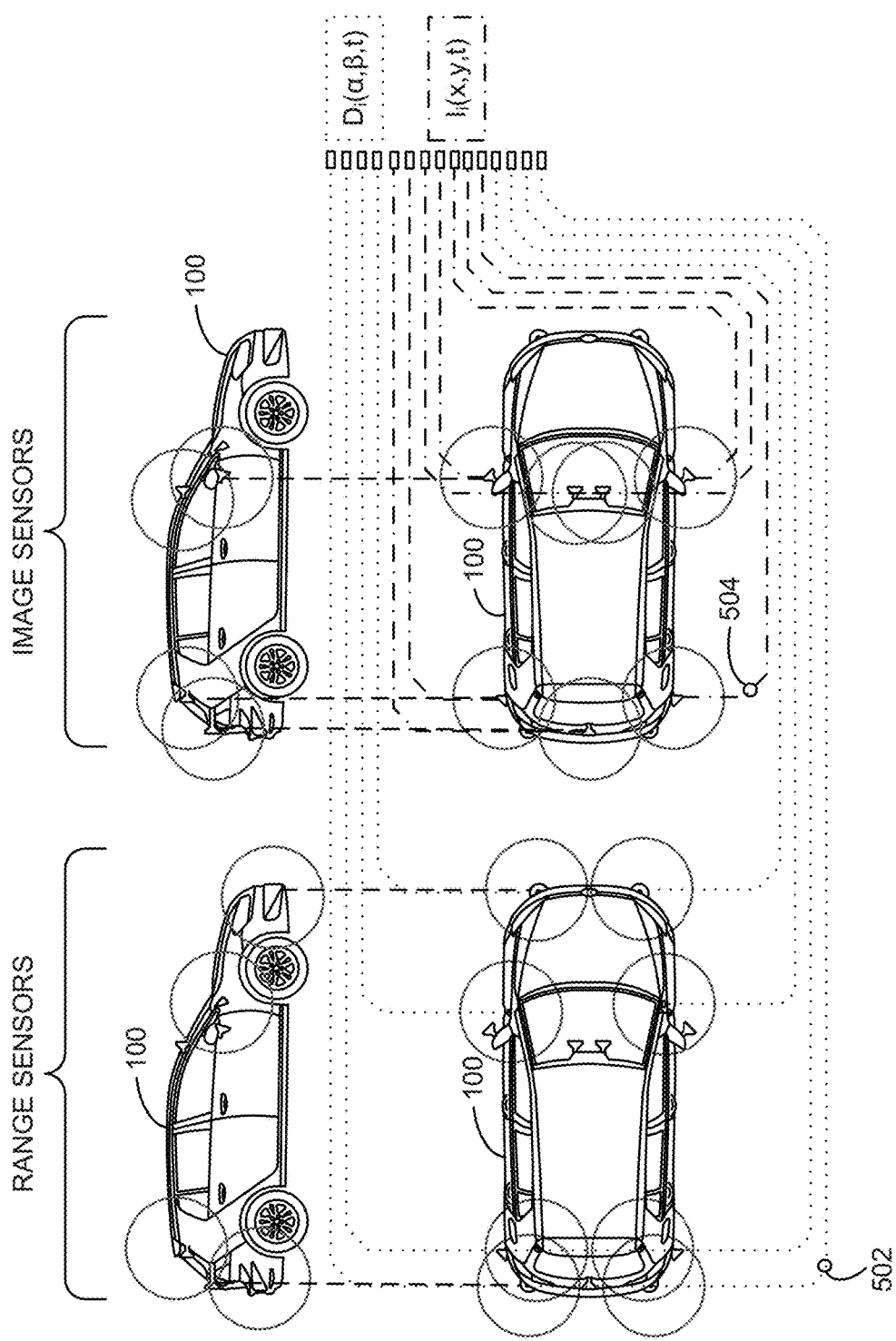
FIG. 5 is an example signal structure representation for sensor data collection in an autonomous vehicle.

FIG. 5 is an example signal structure representation 500 for sensor data collection from multiple heterogeneous sensors of the autonomous vehicle 100. The left side of the FIG. 5 shows multiple locations of range sensors, sometimes referred to as Spherical Mapping Sensor (SMS). Example range sensors include solid state LIDAR sensors such as the LIDAR sensors 204 (FIGS. 2 and 3) and solid state RADAR sensors such as the RADAR sensors 206 (FIGS. 2 and 3). In the example of FIG. 5, the range sensors are routed by lines having a dotted line pattern, one of which is indicated by reference number 502. In the illustrated example of FIG. 5, the range sensors (i) produce the range distance function ($Di(\alpha,\beta,t)$) stored as a 2D array structure indexed by Azimuth ($\alpha$) and Elevation angles ($\beta$) in association with a data collection time indicated by a timestamp (t).

The right side of FIG. 5 shows multiple locations of image sensors (e.g., visible light cameras and thermal cameras). In the illustrated example, the image sensors (i) produce images ($Ii(x,y,t)$) organized as a rectangular raster grid indexed by horizontal and vertical dimensions (x, y) and collected at a data collection time indicated by a timestamp (t). In the example of FIG. 5, the image sensors are routed by lines having a line pattern of dots and dashes, one of which is indicated by reference number 504. In some examples, some image sensors of the autonomous vehicle 100 produce a single type of output while others provide multiple types of outputs. For example, one type of camera of the autonomous vehicle 100 may produce a single channel (near infrared) of sensor data, and another type of camera of the autonomous vehicle 100 may produce multiple channels of sensor data such as red, green, and blue (RGB) information for visible light cameras.

FIG. 6 is an example auto-encoder (AE) 600 for use in performing anomaly detection. The auto-encoder 600 is a neural network with a symmetric structure of networked nodes that generate output data corresponding to their input data in accordance with their training. For example, a middle layer output of the neural network represents an encoding of input data. In the illustrated example, the auto-encoder 600 is a single-sensor encoder that processes sensor data collected by the sensor data interface 402 (FIG. 4) from one of the multiple sensors 202, 204, 206, 304. In the illustrated example of FIG. 6, the input sensor data is shown as an input image 603. The example auto-encoder 600 is trained to reconstruct its input onto an output layer, while verifying certain restrictions that prevent the auto-encoder 600 from merely copying the input data along the neural network and outputting the same input data. To process input sensor data from multiple ones of the sensors 202, 204, 206, 304, multiple ones of the auto-encoder 600 can be employed as described below in connection with FIG. 7.

A convolutional auto-encoder is a neural network with a convolution at any layer but is typically applied at the input. An auto-encoder is undercomplete if the encoding layer has a lower dimensionality than the input. In the illustrated example of FIG. 6, reducing the number of nodes or neurons in the subsequent layers of the auto-encoder 600 imposes size and redundancy rejection and reshaping restrictions. As such, the neural network of the auto-encoder 600 compresses the information from the input (in higher dimensional space) into a lower dimensional space. Such compressing maps features of the input data from an over-redundant manifold to a less-redundant manifold with content-preserving properties. This results in the compressed output information retaining features of interest that are represented in the input data while simultaneously reducing the size of the data to be analyzed which, in turn, decreases the processing resources and processing time to analyze the collected sensor data for anomalies.

In the illustrated example of FIG. 6, the first half of the auto-encoder 600 is an encoder sub-net 602 shown as the left portion of the auto-encoder 600, and the second half of the auto-encoder 600 is a decoder sub-net 604 shown as the right portion of the auto-encoder 600. The output of the encoder sub-net 602 portion of the auto-encoder 600 is a feature vector shown as an encoded-compact sparse sensor data representation ($Fi(t)$) 606 (e.g., encoded sensor data) which depicts the same input image in less space and, thus, with higher information density. In the illustrated example of FIG. 6, the encoded-compact sparse sensor data representation ($Fi(t)$) 606 is decoded by the decoder sub-net 604 to produce or generate an example encoded-decoded image 608 (e.g., reconstructed sensor data). Moreover, the feature vector represented by the encoded-compact sparse sensor data representation ($Fi(t)$) 606 preserves similarity metrics and is highly sparse (low-firing values on neuron outputs). These properties are explicitly obtained during training of the auto-encoder 600 using an engineered cost function. An example of such an engineered cost function includes, in addition to input-output deviations, cost factors to enforce convergence. Convergence minimizes the number of triggered neurons and derivative properties to accommodate similarity metrics criteria.

Once a full (unsupervised) training of the auto-encoder 600 has been conducted, the auto-encoder 600 can be used to process input sensor data collected from different sensor signals (e.g., images, scans, etc. depending on the sensor type) and generate compressed output data to determine a pixel-to-pixel (for camera sensors 202) and/or a point-to-point (for LIDAR sensors 204, RADAR sensors 206, SONAR sensors) absolute discretized and quantized deviation D(Ii(x,y,t), Ii(x,y,t)) between an original input image (Ii(x,y,t)) 603 and a reconstructed image (Ii(x,y,t)') 608 output by the decoder sub-net 604. The absolute discretized and quantized deviation D(Ii(x,y,t), Ii(x,y,t)) is a measure of deviation between corresponding pixels or points of the original input image (Ii(x,y,t)) 603 and the reconstructed image (Ii(x,y,t)') 608 expressed as a statistical deviation model $N(\mu_i, \sigma_i^2)$ per sensor (i). In the statistical deviation model $N(\mu_i, \sigma_i^2)$, N refers to a normal distribution, the variable μ represents the mean error, and the variable a represents the standard deviation of the mean error. By keeping track of the pixel-to-pixel deviations and/or point-to-point deviations, the absolute discretized and quantized deviation can be represented as an example validation deviation histogram 610 as shown in FIG. 6. The example validation deviation histogram 610 is a probability distribution function (PDF) of frequencies of pixel-to-pixel deviation amounts and/or point-to-point deviation amounts as an explicit deviation pattern. Based on this discretized format (the histogram 610) of the PDF, the PDF can be fit to any suitable parametric model (e.g., a Gaussian PDF, a Log-Gaussian PDF, a Laplace distribution for images, and/or any other efficiently parametric tractable PDF) to generally, compactly, consistently, and efficiently assert the associated density of a deviation in continuous space. This phase of the anomaly analysis process produces a per-pixel or per-point continuous PDF model representative of the probabilistic deviation pattern of the whole process executed by the auto-encoder 600. This is shown by an example fitted parametric distribution 612 of FIG. 6.

In the example of FIG. 6, when the auto-encoder 600 is trained to meet a desired performance, the statistical deviation model $N(\mu_i, \sigma_i^2)$ is computed by fitting a histogram error (e.g., fitting the parametric distribution 612 to the validation deviation histogram 610 as shown in FIG. 6). The encoder sub-net 602 of the example auto-encoder 600 of FIG. 6 is an encoding part for a single sensor encoder (e.g., a single channel encoder in the). The example encoder sub-net 602 and the per-point PDF that it generates are the systematic structural components to apply a core modeling process to each of the sensors 202, 204, 206, 304 regardless of the sensor type (e.g., a camera type, a LIDAR type, a RADAR type, a SONAR type, etc.).

Figure 7:
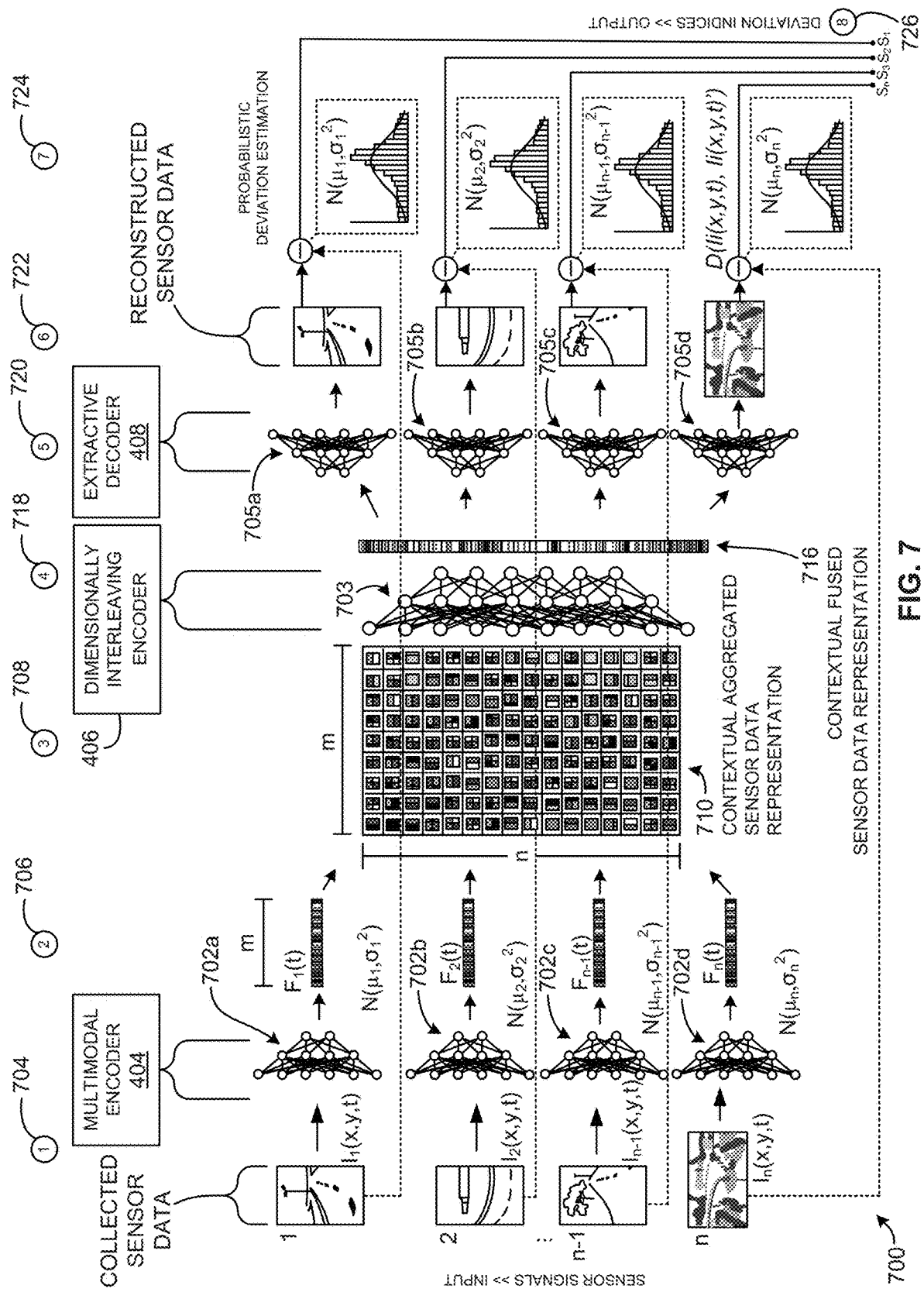
FIG. 7 illustrates an example feature fusion and deviation estimation data flow for use in anomaly detection in accordance with teachings of this disclosure based on sensor data collected from the autonomous vehicle of FIGS. 1-5.

FIG. 7 is an example feature fusion and deviation estimation data flow 700 for use in anomaly detection based on sensor data collected from the autonomous vehicle 100 of FIGS. 1-5. The example feature fusion and deviation estimation data flow 700 of FIG. 7 is implemented using multiple hierarchical auto-encoders that form the example multimodal encoder 404, the example dimensionally interleaving encoder 406, and the example extractive decoder 408 of FIG. 4. In the illustrated example of FIG. 7, the multimodal encoder 404 is formed of multiple example encoder sub-nets 702a-d, and the dimensionally interleaving encoder 406 is formed of an example global encoder sub-net 703. The example encoder sub-nets 702a-d and the example global encoder sub-net 703 are substantially similar or identical to the encoder sub-net 602 of the auto-encoder 600 of FIG. 6. Also in the illustrated example of FIG. 7, the extractive decoder 508 is implemented by multiple example decoder sub-nets 705a-d which are substantially similar or identical to the decoder sub-net 604 of the auto-encoder 600. In the example of FIG. 7, encoder sub-nets 702a-d, the global encoder sub-net 703, and the decoder sub-nets 705a-d are based on convolutional, under-complete, sparse and structure-preserving auto-encoders. The example feature fusion and deviation estimation data flow 700 of FIG. 7 can be employed after training the hierarchical auto-encoders 702a-d, 703, 705a-d based on input sensor data and desired output results.

In the example of FIG. 7, sensor data (Ii(x,y,t)) from ones of the sensors 202, 204, 206, 304 is provided to the encoder sub-nets 702a-d of the multimodal encoder 404. For example, the sensor data (Ii(x,y,t)) may be obtained by the sensor data interface 402 of FIG. 4. In the example of FIG. 7, three input sensor data (e.g., shown as i=1 to i=n−1) are from visible light cameras, and fourth input sensor data (e.g., shown as i=n) is from a LIDAR sensor. However, this is merely illustrative, and the example of FIG. 7 is more broadly applicable to any number of sensors and/or any suitable types of sensors arranged in a heterogeneous sensor configuration as described above in connection with FIGS. 1 and 2. In any case, the input sensor data (Ii(x,y,t)) is collected at a same time (t).

At a first phase (1) 704 of FIG. 7, the example encoder sub-nets 702a-d of the multimodal encoder 404 process the input collected sensor data to generate corresponding latent lower dimensional representations. Because of the diverse resolutions and types of sensors 202, 204, 206, 304, at the first phase (1) 704, the example encoder sub-nets 702a-d generate encoded sensor data representations of different sizes (e.g., due to the multiple dimensionality of the input data). The encoded sensor data outputs are shown at a second phase (2) 706 as diverse-length sensor data representations that are normalized to a length of m compressed data points on a dimension-by-dimension basis. The encoded sensor data outputs at the second phase (2) 706 are encoded-compact sparse sensor data representations (Fi(t)) such as the encoded-compact sparse sensor data representation (Fi(t)) 606 of FIG. 6. Generating such encoded-compact sparse sensor data representations (Fi(t)) for each set of synchronized signals from the sensors 202, 204, 206, 304 is based on an inference execution of the n-encoder sub-nets 702a-d. This has low computational cost and can be parallelized using any suitable form of neural accelerator including graphics processing units (GPUs), field programmable gate arrays (FPGAs), and hybrid processors such XPU (e.g., combined CPU/GPU).

At a third phase (3) 708 of FIG. 7, the example aggregator 405 (FIG. 4) receives a quantity of n encoded-compact sparse sensor data representations (Fi(t)) (e.g., encoded sensor data) from the encoder sub-nets 702a-d and generates a contextual aggregated sensor data representation 710 of the collected sensor data (Ii(x,y,t)) based on the encoded-compact sparse sensor data representations (Fi(t)). In the illustrated example, the contextual aggregated sensor data representation 710 is of the same length m compressed data points as the encoded-compact sparse sensor data representations (Fi(t)). The contextual aggregated sensor data representation 710 at the third phase (3) 708 is an image containing neuro-compressed sparse partial representations of dimensionally rearranged components of each sensor data representation. For example, the aggregator 405 aggregates or stacks the encoded-compact sparse sensor data representations (Fi(t)) together on a per-dimension basis to generate the contextual aggregated sensor data representation 710. The dimension-by-dimension structural arrangement of the contextual aggregated sensor data representation 710 is well-suited for scalability because additional channels of input sensor data can be added through the same dimension-by-dimension aggregation used to form the contextual aggregated sensor data representation 710. An example technique for generating the contextual aggregated sensor data representation 710 is described below in connection with FIG. 9.

In the illustrated example, the contextual aggregated sensor data representation 710 describes the entire 360-degree scene at which the autonomous vehicle 100 is located. Despite its compressed encoding, there are still redundancies in the contextual aggregated sensor data representation 710. These redundancies are produced by content that repeats two or more times from overlapping fields of view of the multiple sensors 202, 204, 206, 304. The sensors 202, 204, 206, 304 overlap and their associated overlapping sensor data acts as an information melting agent that is used by the example global encoder sub-net 703 of the dimensionally interleaving encoder 406 (FIG. 4) to fuse the partial encoded representations (e.g., the encoded-compact sparse sensor data representation (Fi(t)) of the second phase (2) 706 at overlapping data of the whole-environment representation. For example, the example global encoder sub-net 703 implements the dimensionally interleaving encoder 406 to generate a contextual fused sensor data representation 716 as depicted in fourth phase (4) 718 of the pipe-line in FIG. 7. The training procedure and the topology of the example global encoder sub-net 703 is substantially similar or identical to the training principle and architecture of the auto-encoder 600 described above in connection with FIG. 6.

By fusing the encoded-compact sparse sensor data representation (Fi(t)) of the second phase (2) 706 into the contextual fused sensor data representation 716, the global encoder sub-net 703 creates a second level of compression that wholly represents the environment 302 in which the autonomous vehicle 100 is located. In the illustrated example of FIG. 7, the contextual fused sensor data representation 716 is a whole-scene context fused representation (CFR) of the environment 302 based on sensor data (Ii(x,y,t)) from multiple ones of the sensors 202, 204, 206, 304.

The contextual fused sensor data representation 716 of the fourth phase (4) 718 removes redundancies (from multiple ones of the sensors 202, 204, 206, 304) that were still present in the contextual aggregated sensor data representation 710. At the same time, the contextual fused sensor data representation 716 combines common or matching aspects from the different encoded-compact sparse sensor data representations (Fi(t)) in the contextual aggregated sensor data representation 710. Such combining of common or matching aspects from the different encoded-compact sparse sensor data representations (Fi(t)) reduces the amount of data used to represent the input sensor data (Ii(x,y,t)) relative to the amount of data of the contextual aggregated sensor data representation 710. In addition, such combining of common or matching aspects emphasizes anomalies in the input sensor data (Ii(x,y,t)) because decoding a reconstructed version (Ii(x,y,t)') of the input sensor data (Ii(x,y,t)) based on the contextual fused sensor data representation 716 at the fifth phase (5) 720 and the sixth phase (6) 722 will not result in a sufficiently similar version of the input sensor data (Ii(x,y,t)) as described below. A sufficiently large deviation between reconstructed input sensor data (Ii(x,y,t)') and original input sensor data (Ii(x,y,t)) is indicative of an anomaly that could be due to a failing sensor, an obstructed sensor, a malicious attack on the autonomous vehicle 100, etc.

At a fifth phase (5) 720 of FIG. 7, the contextual fused sensor data representation 716 is provided to the decoder sub-nets 705*a* of the extractive decoder 408. In the illustrated example, the decoder sub-nets 705*a-d* have been trained to decode or extract the reconstructed versions (Ii(x,y,t)') of the original input sensor data (Ii(x,y,t)) from the contextual fused sensor data representation 716. In other words, for each sensor (i) 202, 204, 206, 304 (FIGS. 2 and 3), a decoder (di) (e.g., the decoder sub-nets 703*a-d*) is trained using a whole-scene CFR to obtain a reconstructed version (Ii(x,y,t)') of the original input sensor data (Ii(x,y,t)). This decoding is shown at a sixth phase (6) 722 of FIG. 7 at which each of the decoder sub-nets 703*a-d* depicted extracts reconstructed input sensor data (Ii(x,y,t)') from the contextual fused sensor data representation 716. If anomalous data exists in original input sensor data (Ii(x,y,t)) for a particular sensor, this will be pronounced during the decoding of the sixth phase (6) 722 as the decoder sub-nets 703*a-d* will not be able to correctly decode the contextual fused sensor data representation 716 for that sensor to generate reconstructed input sensor data (Ii(x,y,t)') that sufficiently matches corresponding original input sensor data (Ii(x,y,t)) for that sensor. That is, expected melting agents (regions of overlap) between the input sensor data (Ii(x,y,t)) differ (instead of being similar, as expected) when an anomalous feature is present in collected input sensor data (Ii(x,y,t)) from a first sensor but not in collected input sensor data (Ii(x,y,t)) of a neighboring or overlapping second sensor. As such, the fusing of the contextual aggregated sensor data representation 710 into the contextual fused sensor data representation 716 is abnormal for the first and second collected sensor data (Ii(x,y,t)) of the neighboring or overlapping first and second sensors. Such an abnormal fusion results in a subsequent abnormal decoding of the contextual fused sensor data representation 716. That is, the missing expected melting agents (overlapping regions) in the contextual aggregated sensor data representation 710 results in erroneous artifacts in the contextual fused sensor data representation 716 that are inconsistent with expected fusion in accordance with previous training of global encoder sub-net 703 and the decoder sub-nets 705*a-d*. When the contextual fused sensor data representation 716 is decoded to generate reconstructed sensor data, the artifacts appear in the reconstructed input sensor data (Ii(x,y,t)') as deviations from original input sensor data (Ii(x,y,t)) that did not include an anomalous feature. For example, if first input sensor data (Ii(x,y,t)) does not include an anomalous feature and second input sensor data (Ii(x,y,t)) (from an overlapping or neighboring sensor) does include an anomalous feature, the contextual fused sensor data representation 716 generated based on the first and second input sensor data (Ii(x,y,t)) will include abnormal artifacts due to the anomalous feature in the second input sensor data (Ii(x,y,t)). Such abnormal artifacts will affect the decoding of the contextual fused sensor data representation 716 for both first reconstructed input sensor data (Ii(x,y,t)') corresponding to the first input sensor data (Ii(x,y,t)) and second reconstructed input sensor data (Ii(x,y,t)') corresponding to the second input sensor data (Ii(x,y,t)). The first reconstructed input sensor data (Ii(x,y,t)') will be different from the corresponding first input sensor data (Ii(x,y,t)) due to the anomalous feature in the second input sensor data (Ii(x,y,t)). A sufficiently large deviation between reconstructed input sensor data (Ii(x,y,t)') and corresponding original input sensor data (Ii(x,y,t)) is indicative of an anomaly in sensor data.

The example contextual fused sensor data representation 716 is a larger information source than each individual reconstructed input sensor data (Ii(x,y,t)'). Thus, the decoding processes of the sixth phase (6) 722 also generate an uncertainty model corresponding to the deviation of the reconstructed input sensor data (Ii(x,y,t)') relative to the original input sensor data (Ii(x,y,t)), not relative to the larger-size CFR represented in the example contextual fused sensor data representation 716. After completion of the sixth phase (6) 722 of the pipe-line, the extraction of the reconstructed input sensor data (Ii(x,y,t)') has been completed.

At a seventh phase (7) 724 of FIG. 7, the example extractive deviation distribution analyzer 410 (FIG. 4) performs a deviation analysis on the reconstructed input sensor data (Ii(x,y,t)') and the original input sensor data (Ii(x,y,t)) to determine a probabilistic deviation estimation in the form of a statistical deviation model $N(\mu_i, \sigma_i^2)$. The deviation analysis assesses the deviation of the reconstructed input sensor data (Ii(x,y,t)') relative to corresponding ones of the original input sensor data (Ii(x,y,t)) from ones of the sensors 202, 204, 206, 304. For example, at the seventh phase (7) 724, point-to-point or pixel-to-pixel deviations are evaluated based on PDFs (illustrated by normal distributions) of the reconstructed input signals (Ii(x,y,t)') to produce a density value D(Ii(x,y,t), Ii(x,y,t)). Density values D(Ii(x,y,t), Ii(x,y,t)) are closer to one when there is more similarity between the values of the reconstructed sensor signals (Ii(x,y,t)') and corresponding ones of the original signals (Ii(x,y,t)). Inversely, density values D(Ii(x,y,t), Ii(x,y,t)) decay as a function of the PDF. This deviation analysis process produces a deviation index (Si) for the original input sensor data (Ii(x,y,t)) of each sensor 202, 204, 206, 304. The deviation index (Si) is represented as shown in Equation 1 below.

$$S_i := 1/hw \Sigma_{\{(x,y)\}} \log(N(I_i(x,y) - I_i'(x,y))) \quad \text{(Eq. 1)}$$

In Equation 1 above, the variable Si is an anomaly or abnormal behavior index for a sensor channel (i) (e.g., a sensor channel corresponding to one of the sensors 202, 204, 206, 304), the variable h is the image or scan height, the variable w is the image or scan width, the variable Ii is the original input image (e.g., original input sensor data), the variable Ii' is the reconstructed image (e.g., reconstructed sensor data) also referred to as an encoded-decoded image, the variable x is a horizontal pixel or beam index, the variable y is a vertical pixel or beam index, N is a fitted probabilistic distribution model (e.g., a statistical deviation model) for a sensor channel (i) (e.g., a Gaussian distribution or normal distribution). The deviation indices (Si) of Equation 1 above are depicted at an eighth phase (8) 726 of FIG. 7.

Figure 8:
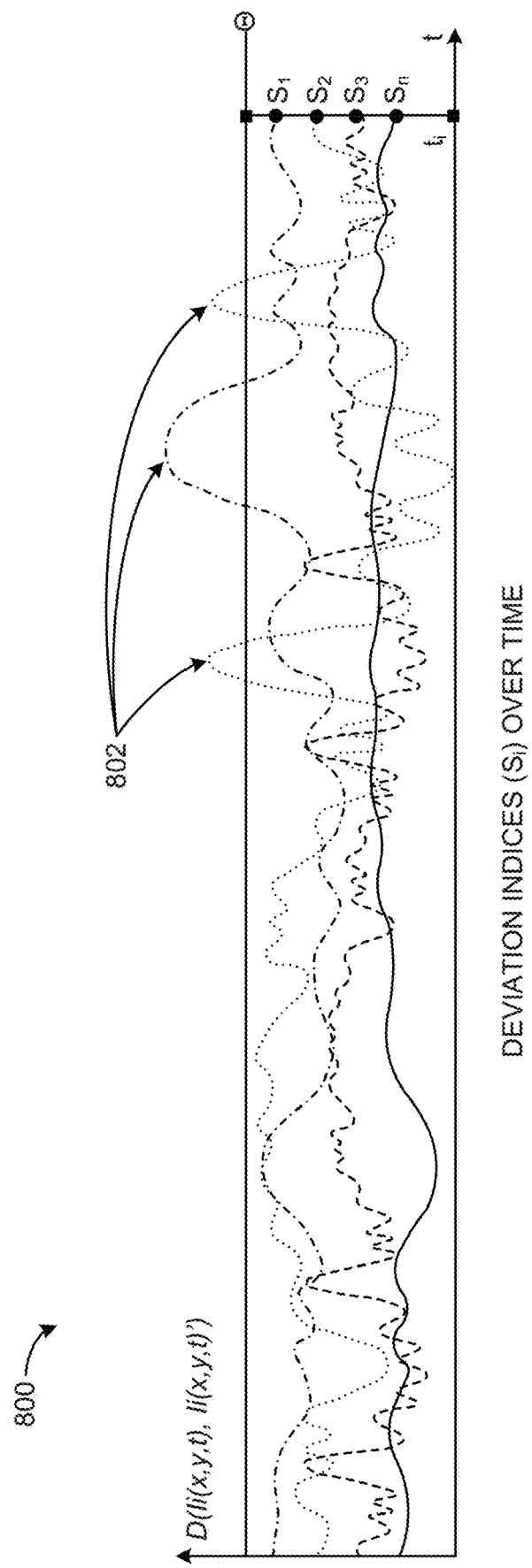
FIG. 8 is an example signal deviation graph for use in anomaly detection based on outputs of the feature fusion and deviation estimation data flow of FIG. 7.

FIG. 8 shows a graph 800 of example line plots of deviation indices (Si) over time (t). In the illustrated example of FIG. 8, for each of the deviation indices (Si), there is a learned threshold ($\Theta$i) obtained for each sensor channel (i) as the maximal deviation index (Si) computed during the training. As such, an abnormal behavior trigger function κ is a function of the deviation indices (Si) (e.g., an anomaly or abnormal behavior index for a sensor channel (i)) and the threshold ($\Theta$i) as shown in Equation 2 below.

$$\kappa(S_i, \Theta_i) := \{1 \text{ if } S_i < \Theta_i, \text{ else } 0\} \quad \text{(Eq. 2)}$$

Equation 2 above is used by the example anomaly detector 412 of FIG. 4 to determine when a deviation is considered as abnormal based on the per-sensor-channel threshold ($\Theta$i). The per-sensor-channel threshold value ($\Theta$i) is selected as a level that, when exceeded (e.g., satisfied), indicates an anomaly in sensor data. The threshold value ($\Theta$i) may be selected per sensor channel (i) autonomously by a processor based on analyzing historical anomalies. For example, the threshold value ($\Theta$i) may be selected based on the statistical deviation model $N(\mu_i, \sigma_i^2)$ such that $\Theta i = \mu + 4\sigma$, where the variable $\mu$ represents the mean error, and the variable $\sigma$ represents the standard deviation of the mean error. The per-sensor-channel threshold value ($\Theta$i), the mean error $\mu$, and the standard deviation a are single scalar, one-dimensional data. Alternatively, instead of a processor autonomously selecting the per-sensor-channel (i) threshold value ($\Theta$i), the per-sensor-channel (i) threshold value ($\Theta$i) may be selected by a user. In this manner, the anomaly detector 412 detects an anomaly in a probabilistic deviation estimation represented by a deviation index (Si) based on the deviation index (Si) and the threshold ($\Theta$i) evaluated using the abnormal behavior trigger function κ is of Equation 2 above. In such examples, the detected anomaly is indicative of an error in operation of a sensor 202, 204, 206, 304 corresponding to the deviation index (Si) for which the anomaly was detected. In the illustrated example of FIG. 8, anomalies are shown as indicated by reference number 802 for line plots of three deviation indices (Si) that exceed (e.g., satisfy) the threshold ($\Theta$i). In Equation 2, a value of one (1) for the trigger function κ is indicative of no anomaly, while a value of zero (0) for the trigger function κ is indicative of a detected anomaly.

In addition, the anomaly detector 412 can also generate per-sensor-channel confidence scores (Ci) for ones of the sensors 202, 204, 206, 304. A confidence score (Ci) is expressed as a density in accordance with Equation 3 below.

$$C_i = e^{(-Si/\Theta i)} \quad \text{(Eq. 3)}$$

In Equation 3 above, the per-sensor-channel confidence score (Ci) is equal to the exponential function (e) for a quotient of the per-sensor-channel deviation index (Si) divided by the per-sensor-channel threshold value ($\Theta$i). The confidence score (Ci) is a metric that represents a level of confidence in a sensor's input sensor data (Ii(x,y,t)) relative to an overall acquired context from multiple sensors of the autonomous vehicle 100 at a particular timestamp (t). The confidence score (Ci) can be used as a gain or density-per-sensor which is useful for use in multiple probabilistic inference and state assertion techniques. The confidence score (Ci) is single scalar, one-dimensional data.

Figure 9:
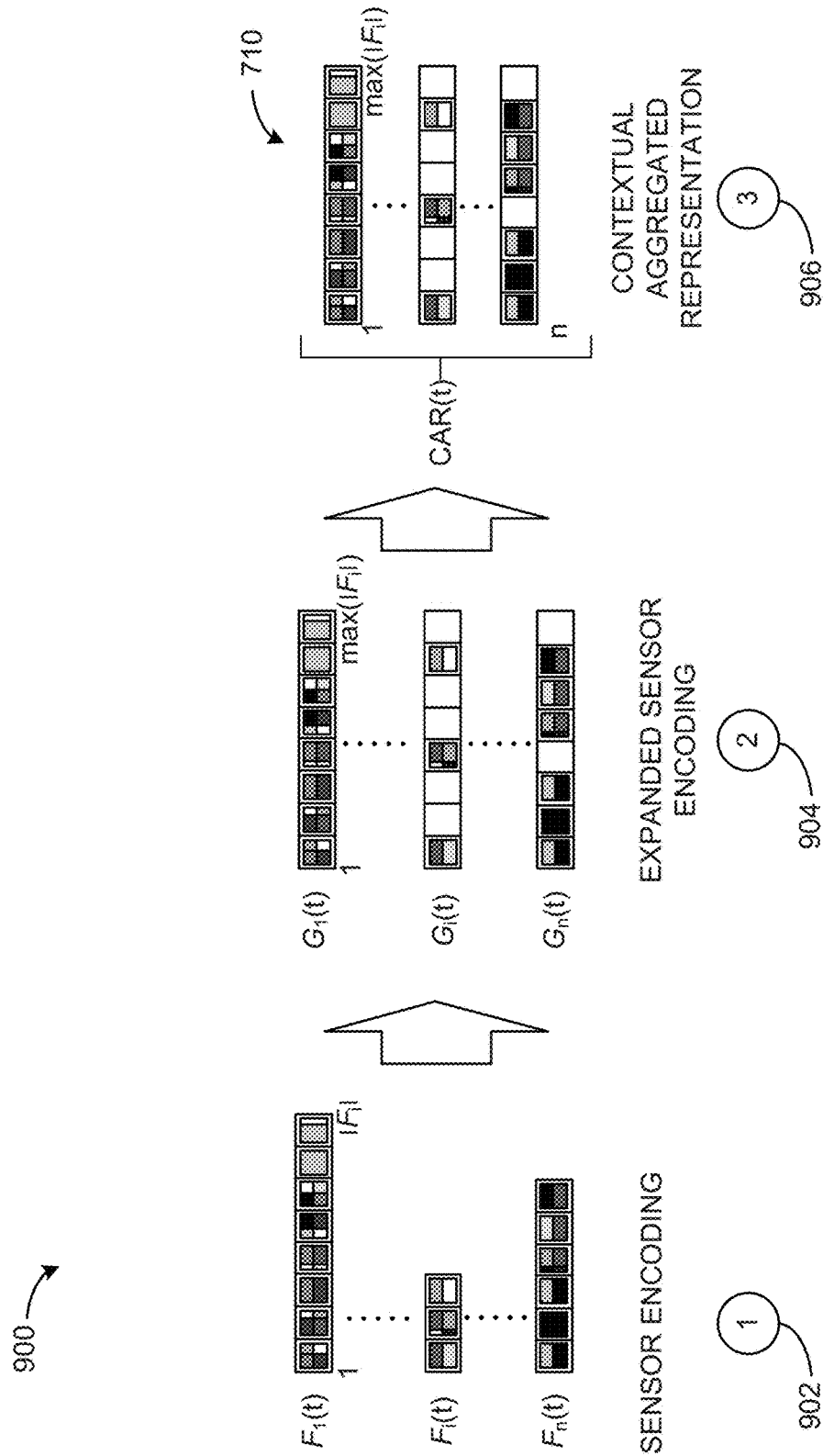
FIG. 9 illustrates an example technique for generating a contextual fused representation of input sensor data.

FIG. 9 is an example technique for generating the example contextual aggregated sensor data representation 710 (FIG. 7) of input sensor data (Ii(x,y,t)). The illustrated example of FIG. 9 represents an example process conducted to arrange the dimensions from the compressed representations of sensor data from the sensors 202, 204, 206, 304 (FIGS. 2 and 3). This example process generates a dimension-by-dimension interleave arrangement (e.g., the horizontal dimension (x), the vertical dimension (y), the time dimension (t)) of the encoded-compact sparse sensor data representations (Fi(t)) corresponding to the multiple sensors 202, 204, 206, 304 to form the contextual aggregated sensor data representation 710. In other words, the contextual aggregated sensor data representation 710 is composed by individually stacking corresponding dimensions or like dimensions of the multiple encoded-compact sparse sensor data representations (Fi(t)). That is, data at x,y,t dimension values from one encoded-compact sparse sensor data representation (Fi(t)) are stacked along data of matching x,y,t dimension values of another encoded-compact sparse sensor data representation (Fi(t)).

The example process 900 of FIG. 9 to generate the contextual aggregated sensor data representation 710 (CAR(t)) is shown as three operations including an example sensor encoding operation 902, an example expanded sensor encoding operation 904, and an example contextual aggregated representation operation 906. At the example sensor encoding operation 902, the multimodal encoder 404 (FIGS. 4 and 7) sorts a quantity (n) of encoded-compact sparse sensor data representations (Fi(t)) stored in a list U by length (number of dimensions (dim(Fi(t))) in such a way that the first in the list U is the shortest encoding.

At the example expanded sensor encoding operation 904, the aggregator 405 (FIGS. 4 and 7) creates an empty contextual fused representation CFR as a square matrix of dimensions (n), such as if $l=\Sigma_i^n \text{dim}(F_n(t))$ then $n=\text{ceil}(l^{1/2})$.

At the example contextual aggregated representation operation 906, the aggregator 405 obtains the first element (e.g., $F_0(t)$) in the list (U) and copies each of its dimension values to the CRF to the closest empty dimension, assuming a regular distribution. For example, if the dimension is n=2000, then the CFR has a dimension $n^2$=4000000. In addition, if in this example $\text{dim}(F_0(t))$=1672, a filling factor $E_0=\text{round}(n^2/\text{dim}(F_0(t)))$=2392, which means that an insertion of an encoded-compact sparse sensor data representations (Fi(t)) will happen approximately each 2392 dimensions. This is an approximation due to accounting for possible index collations. In such examples, the index is shifted into the next dimension until an empty slot (in this sense of dimension value) is found. While the aggregator 405 computes this index to interleave the data of the encoded-compact sparse sensor data representation (Fi(t)) into the CFR, the aggregator 405 employs a module $n^2$, resulting in a circular process that converges based on the calculations at the example contextual aggregated representation operation 906.

When any additional encoded-compact sparse sensor data representation (Fi(t)) remains in the list (U), control returns to the example expanded sensor encoding operation 904 to process the next encoded-compact sparse sensor data representation (Fi(t)). When there are no more encoded-compact sparse sensor data representations (Fi(t)) in the list (U), the example aggregator 405 finalizes the example process 900. As a result of the interleaving of the contextual aggregated representation operation 906 for the encoded-compact sparse sensor data representations (Fi(t)) in the list (U), the aggregator 405 generates the contextual aggregated sensor data representation 710 of FIG. 7 and shown in FIG. 9 as CAR(t).

Figure 10A:
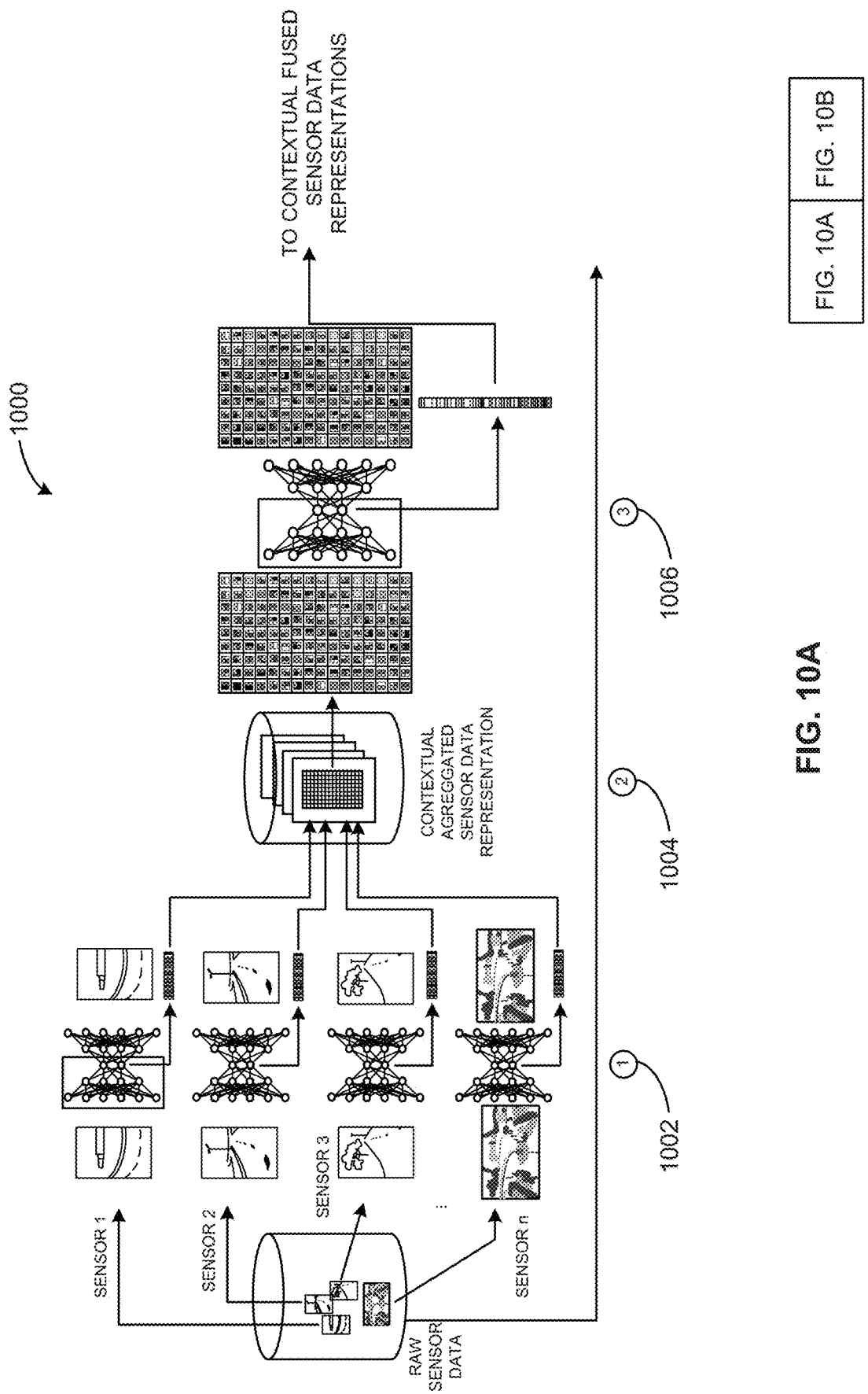
FIGS. 10A and 10B depict an example end-to-end system training of the anomaly detection apparatus of FIGS. 3 and 4 to perform unsupervised multimodal anomaly detection for autonomous vehicles using the example feature fusion and deviation technique of FIG. 7.
Figure 10B:
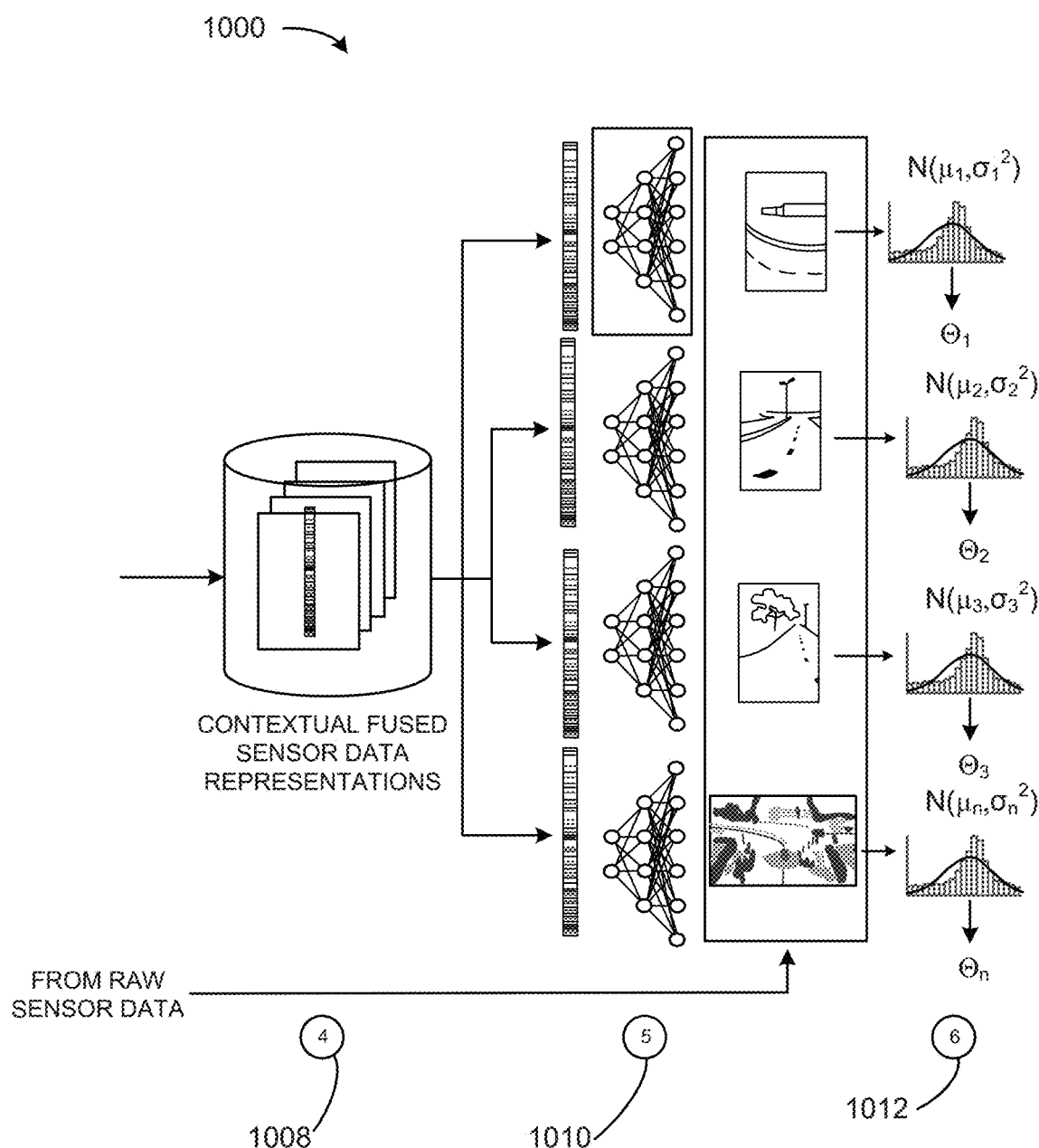

FIGS. 10A and 10B depict an example end-to-end system training data flow 1000 of the anomaly detection apparatus 306 of FIGS. 3 and 4 to perform unsupervised multimodal anomaly detection for autonomous vehicles using the example feature fusion and deviation data flow 700 of FIG. 7. The example end-to-end system training data flow 1000 is shown as including six phases. At an example first phase (1) 1002 (FIG. 10A), the sensor data interface 402 (FIG. 4) obtains multimodal raw sensor data samples (Ii(x,y,t)) from a database to train auto-encoders for corresponding ones of the sensors 202, 204, 206, 304 (FIGS. 2 and 3). Also at the first phase (1) 1002, the multimodal encoder 404 (FIGS. 4 and 7) employs trained auto-encoders to process the raw sensor data to compute encoded-compact sparse sensor data representations (Fi(t)) 606 (FIG. 6) (e.g., encoded sensor data). The auto-encoders of the first phase (1) 1002 correspond to the encoder sub-nets 702a-d of FIG. 7 and are only a part of the composed encoder-decoder schema being trained in the example end-to-end system training data flow 1000. The auto-encoder being trained at the third phase (3) 1006 corresponds to the global encoder sub-net 703 of FIG. 7.

At the example second phase (2) 1004, the example dimensionally interleaving encoder 406 (FIGS. 4 and 7) aggregates the encoded-compact sparse sensor data representations (Fi(t)) 606 to generate a dataset of contextual fused representations for each of the multimodal raw sensor data samples (Ii(x,y,t)). The dataset of contextual fused representations of the second phase (2) 1004 form the contextual aggregated sensor data representation 710 of FIGS. 7 and 9. At the example third phase (3) 1006, the contextual aggregated representation samples of the contextual aggregated sensor data representation 710 are provided to train the encoder sub-net 703 of FIG. 7.

At the example fourth phase (4) 1008 (FIG. 10B), the dimensionally interleaving encoder 406 (FIGS. 4 and 7) employs the encoder sub-net 703 to process the contextual aggregated representation samples of the contextual aggregated sensor data representation 710 and generate the contextual fused sensor data representation 716 (FIG. 7). At the example fifth phase (5) 1010, The contextual fused sensor data representation 716 is used to train the decoder sub-nets 705a-d per sensor 202, 204, 206, 304. The input of each decoder sub-net 705a-d is the same contextual fused sensor data representation 716, and the output is reconstructed input sensor data (Ii(x,y,t)') of a corresponding original raw input sensor data (Ii(x,y,t)).

At the example sixth phase (6) 1012, raw sensor data (Ii(x,y,t)) is obtained from corresponding ones of the sensors 202, 204, 206, 304, corresponding reconstructed sensor data (Ii(x,y,t)') is obtained from corresponding trained decoder sub-nets 705a-d, and the extractive deviation distribution analyzer 410 generates a parametric distribution based on this information. The extractive deviation distribution analyzer 410 fits the difference between the raw sensor data (Ii(x,y,t)) and the corresponding reconstructed sensor data (Ii(x,y,t)'). A threshold value (Θi) per sensor 202, 204, 206, 304 is estimated for each of the fitted distributions. Subsequently, the trained encoder sub-nets 702a-d of the first phase (1) 1004, the trained encoder sub-net 703 of the third phase (3) 1006, the trained decoder sub-nets 705a-d of the fifth phase (5) 1010, and the estimated threshold value (Θi) parameters from the sixth phase (6) 1012 are used to detect anomalies in one or more of the sensors 202, 204, 206, 304.

While an example manner of implementing the autonomous driving apparatus 300 and the anomaly detection apparatus 306 of FIG. 3 is illustrated in FIGS. 3 and 4, one or more of the elements, processes and/or devices illustrated in FIGS. 3 and 4 may be combined, divided, re-arranged, omitted, eliminated and/or implemented in any other way. Further, the example scene contextualizer 308, the example scene analyzer 312, the example drivability map generator 314, the example control scheduler 316, the example controller 318, the example sensor data interface 402, the example multimodal encoder 404, the example aggregator 405, the example dimensionally interleaving encoder 406, the example extractive decoder 408, the example extractive deviation distribution analyzer 410, the example anomaly detector 412, and/or more generally, the example autonomous driving apparatus 300 and/or the example anomaly detection apparatus 306 of FIGS. 3 and 4 may be implemented by hardware, software, firmware and/or any combination of hardware, software and/or firmware. Thus, for example, any of the example scene contextualizer 308, the example scene analyzer 312, the example drivability map generator 314, the example control scheduler 316, the example controller 318, the example sensor data interface 402, the example multimodal encoder 404, the example aggregator 405, the example dimensionally interleaving encoder 406, the example extractive decoder 408, the example extractive deviation distribution analyzer 410, the example anomaly detector 412, and/or more generally, the example autonomous driving apparatus 300 and/or the example anomaly detection apparatus 306 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example scene contextualizer 308, the example scene analyzer 312, the example drivability map generator 314, the example control scheduler 316, the example controller 318, the example sensor data interface 402, the example multimodal encoder 404, the example aggregator 405, the example dimensionally interleaving encoder 406, the example extractive decoder 408, the example extractive deviation distribution analyzer 410, and/or the example anomaly detector 412 is/are hereby expressly defined to include a non-transitory computer-readable storage device or storage disk such as a memory, a digital versatile disk (DVD), a compact disk (CD), a Blu-ray disk, etc. including the software and/or firmware. Further still, the example autonomous driving apparatus 300 and/or the example anomaly detection apparatus 306 of FIGS. 3 and 4 may include one or more elements, processes and/or devices in addition to, or instead of, those illustrated in FIGS. 3 and 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 11:
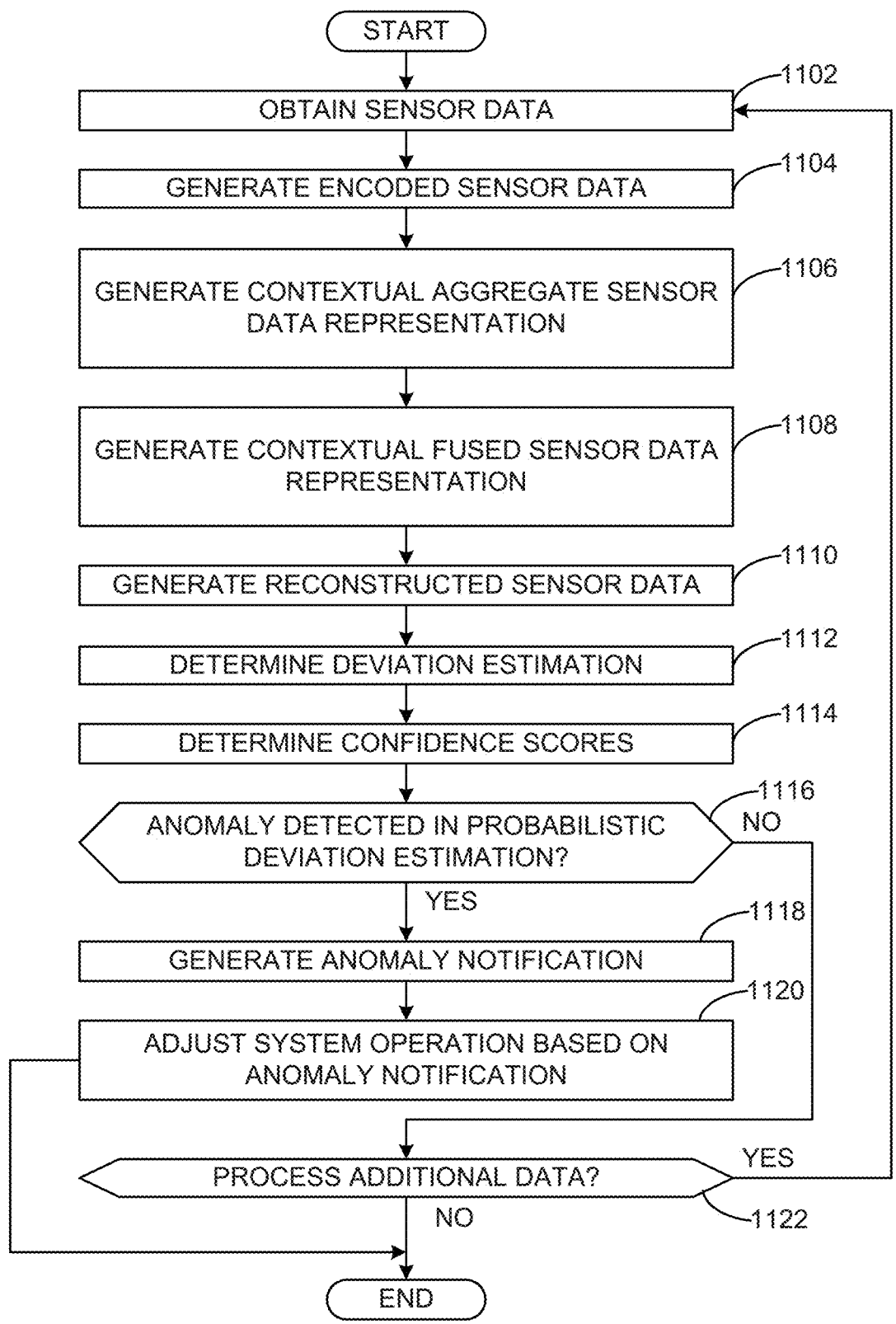
FIG. 11 depicts a flowchart representative of example computer readable instructions that may be executed to implement the example anomaly detection apparatus of FIGS. 3 and 4 to perform unsupervised multimodal anomaly detection for autonomous vehicles.

A flowchart representative of example hardware logic, machine readable instructions, hardware implemented state machines, and/or any combination thereof for implementing the example autonomous driving apparatus 300 and/or the example anomaly detection apparatus 306 of FIG. 3 and FIG. 4 is illustrated in FIG. 11. The machine readable instructions may be an executable program or portion of an executable program for execution by a computer processor such as the processor 1212 shown in the example processor platform 1200 discussed below in connection with FIG. 12. The program may be embodied in software stored on a non-transitory computer-readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIG. 11, many other methods of implementing the example autonomous driving apparatus 300 and/or the example anomaly detection apparatus 306 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example process of FIG. 11 may be implemented using executable instructions (e.g., computer and/or machine readable instructions) stored on a non-transitory computer-readable and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Turning now in detail to FIG. 11, the depicted example process may be used to perform unsupervised multimodal anomaly detection for the autonomous vehicle 100. The example program of FIG. 11 begins at block 1102 at which the example sensor data interface 402 (FIG. 4) obtains first collected sensor data (Ii(x,y,t)) from a first one of the sensors 202, 204, 206, 304 (FIGS. 2 and 3) and second collected sensor data (Ii(x,y,t)) from a second one of the sensors 202, 204, 206, 304. For example, the first one of the sensors is of a first sensor type different than a second sensor type of the second one of the sensors. In addition, the first collected sensor data (Ii(x,y,t)) and the second collected sensor data (Ii(x,y,t)) are of a multi-dimensional format.

The example multimodal encoder 404 (FIG. 4) generates encoded sensor data (block 1104) in the form of the encoded-compact sparse sensor data representation (Fi(t)) 606 (FIG. 6). For example, the multimodal encoder 404 generates first encoded sensor data based on the first collected sensor data (Ii(x,y,t)) and second encoded sensor data based on the second collected sensor data (Ii(x,y,t)).

The example aggregator 405 (FIG. 4) generates a contextual aggregated sensor data representation (block 1106) of collected sensor data based on the encoded sensor data. For example, the aggregator 405 generates the contextual aggregated sensor data representation 710 of the first and second collected sensor data (Ii(x,y,t)) based on the first and second encoded sensor data determined at block 1104 (e.g., in the form of the encoded-compact sparse sensor data representation (Fi(t)) 606).

The example dimensionally interleaving encoder 406 (FIGS. 4 and 7) generates a contextual fused sensor data representation (block 1108). For example, the dimensionally interleaving encoder 406 generates the contextual fused sensor data representation 716 (FIG. 7) based on the contextual aggregated sensor data representation 710 generated at block 1106. The example extractive decoder 408 (FIGS. 4 and 7) generates reconstructed sensor data (block 1110). For example, the extractive decoder 408 decodes first reconstructed sensor data (Ii(x,y,t)') and second reconstructed sensor data (Ii(x,y,t)') from the contextual fused sensor data representation 716.

The example extractive deviation distribution analyzer 410 determines a deviation estimation (block 1112). For example, the extractive deviation distribution analyzer 410 determines the probabilistic deviation estimation in the form of a statistical deviation model $N(\mu_i, \sigma_i^2)$ based on the first reconstructed sensor data (Ii(x,y,t)') and the second reconstructed sensor data (Ii(x,y,t)') decoded from the contextual fused sensor data representation 716. The first reconstructed sensor data (Ii(x,y,t)') corresponds to the first collected sensor data (Ii(x,y,t)), and the second reconstructed sensor data (Ii(x,y,t)') corresponds to the second collected sensor data (Ii(x,y,t)). The probabilistic deviation estimation represents likelihoods of point-to-point deviations or pixel-to-pixel deviations between: (a) the first reconstructed sensor data (Ii(x,y,t)'), and (b) the first collected sensor data (Ii(x,y,t)) from the first one of the sensors 202, 204, 206, 304. In some examples, the extractive deviation distribution analyzer 410 can also determine a probabilistic deviation estimation representing likelihoods of point-to-point deviations or pixel-to-pixel deviations between: (a) the second reconstructed sensor data (Ii(x,y,t)'), and (b) the second collected sensor data (Ii(x,y,t)) from the second one of the sensors 202, 204, 206, 304.

The example anomaly detector 412 (FIG. 4) determines confidence scores (Ci) for the sensors 202, 204, 206, 304 (block 1114). For example, the anomaly detector 412 determines the confidence scores (Ci) based on Equation 3 above as a metric to represent a confidence level of the reliability of a sensor's input sensor data (Ii(x,y,t)). In some examples, such confidence scores (Ci) can be used to assess the likelihood that an anomaly detected by the anomaly detector 412 is merely an anomaly or an actual feature detected in the environment 302 (FIG. 3).

The example anomaly detector 412 determines whether it detects an anomaly in the probabilistic deviation estimation (block 1116). A detected anomaly is indicative of an error in operation of the first one of the sensors. For example, the anomaly detector 412 detects an anomaly when the probabilistic deviation estimation (determined at block 1112) exceeds (e.g., satisfies) a threshold value (Θi) for the corresponding sensor as described above in connection with FIGS. 7 and 8.

If an anomaly is detected at block 1116, the anomaly detector 412 generates an anomaly notification (block 1118). For example, the anomaly notification may be in the form of an electronic message communicated by the anomaly detector 412 via a bus and/or stored by the anomaly detector 412 in memory for subsequent retrieval by another component of the example autonomous driving apparatus 300 and/or the example anomaly detection apparatus 306. In the illustrated example, the anomaly detector 412 provides the anomaly notification to the scene contextualizer 308 and/or the scene analyzer 312 of FIG. 3. For example, the anomaly notification identifies the collected sensor data (Ii(x,y,t)) (e.g., a record entry of the sensor data) and its corresponding one of the sensors as exhibiting abnormal characteristics about the environment 302. In some examples, the anomaly detector 412 stores an identifier of the collected sensor data (Ii(x,y,t)) (e.g., a key value or memory location of a record entry at which the sensor data is stored in memory) in the anomaly notification. In some examples, the anomaly detector 412 stores a sensor identifier of the corresponding sensor in the anomaly notification. In some examples, the anomaly detector 412 also stores the confidence scores (Ci) corresponding to the sensors 202, 204, 206, 304 in the anomaly notification.

The scene contextualizer 308 and/or the scene analyzer 312 of FIG. 3 adjust system operation based on the anomaly notification (block 1120). For example, the scene contextualizer 308 and/or the scene analyzer 312 can adjust system operation of the autonomous driving apparatus 300 (FIG. 3) by accounting for the anomaly and performing mitigating procedures to discard the anomalous collected sensor data (Ii(x,y,t)) and/or replace the anomalous collected sensor data (Ii(x,y,t)) with more reliable collected sensor data (Ii(x,y,t)) from another sensor. In some examples, the scene contextualizer 308 and/or the scene analyzer 312 select another sensor that is deemed more reliable based on the confidence scores (Ci) determined by the anomaly detector 412.

After adjusting system operation at block 1120, or if an anomaly is not detected at block 1116, the example sensor data interface 402 determines whether there is additional collected sensor data (Ii(x,y,t)) to process (block 1122). For example, there may be additional collected sensor data (Ii(x,y,t)) corresponding to a subsequent timestamp (t) that is to be processed. In this manner, the process of FIG. 11 can repeat for multiple timestamps (t) to process collected sensor data (Ii(x,y,t)) in real time while the autonomous vehicle 100 is operating. If there is additional collected sensor data (Ii(x,y,t)) to process, control returns to block 1102. Otherwise, the example process of FIG. 11 ends. For example, the autonomous vehicle 100 is no longer operating (e.g., it is turned off).

Figure 12:
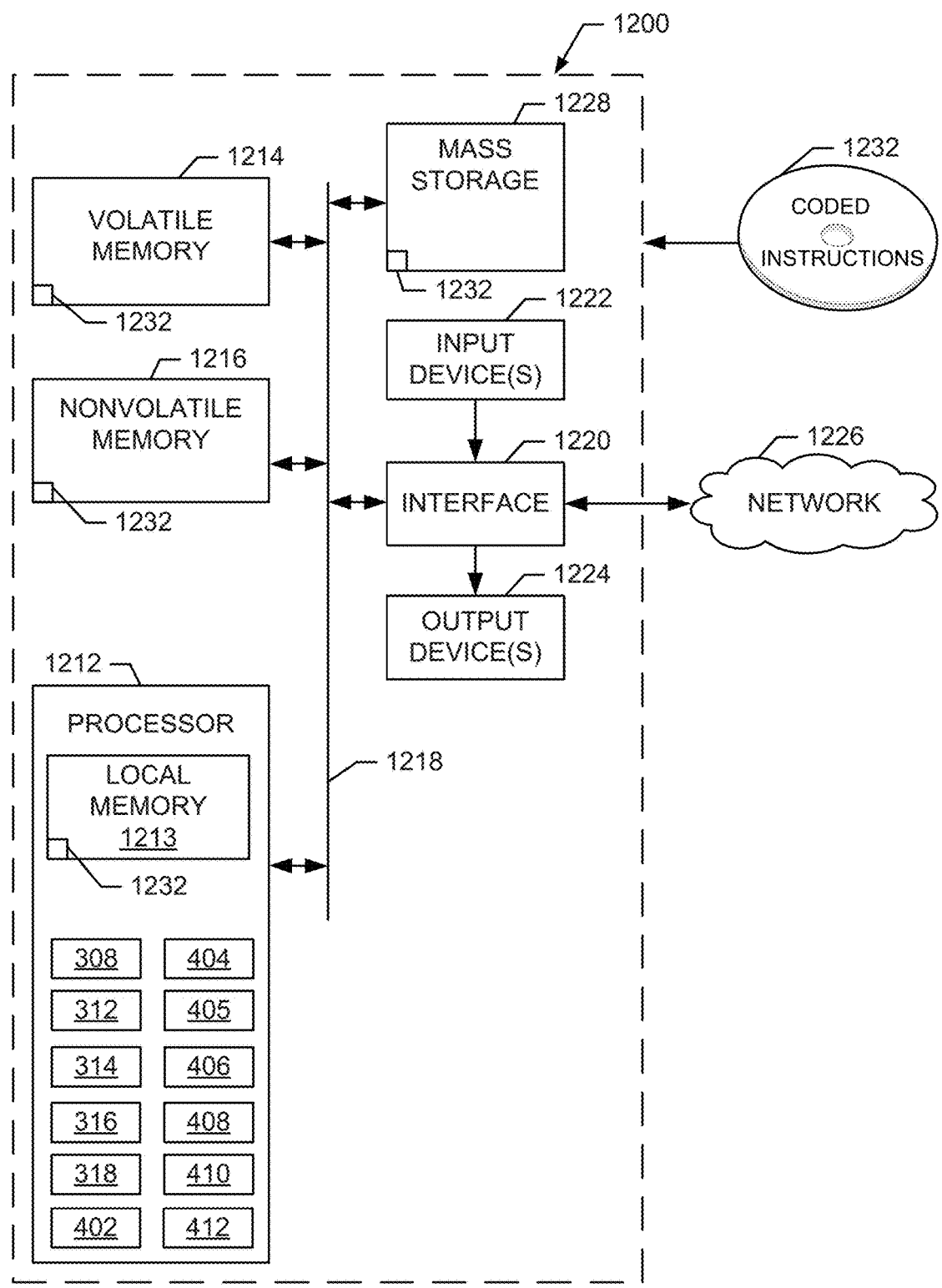
FIG. 12 is a block diagram of an example processing platform structured to execute the instructions of FIG. 11 to implement the example autonomous driving apparatus of FIG. 3 and/or the example anomaly detection apparatus of FIGS. 3 and 4 to perform unsupervised multimodal anomaly detection for autonomous vehicles.

FIG. 12 is a block diagram of an example processing platform 1200 structured to execute the instructions of FIG. 11 to implement the example autonomous driving apparatus 300 of FIG. 3 and/or the example anomaly detection apparatus 306 of FIGS. 3 and 4 to perform unsupervised multimodal anomaly detection for the example autonomous vehicle 100 (FIGS. 1-5). The processor platform 1200 can be, for example, a server, a computer, a self-learning machine (e.g., a neural network), or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor 1212 may be a semiconductor based (e.g., silicon based) device. In this example, the processor implements the example scene contextualizer 308, the example scene analyzer 312, the example drivability map generator 314, the example control scheduler 316, the example controller 318, the example sensor data interface 402, the example multimodal encoder 404, the example aggregator 405, the example dimensionally interleaving encoder 406, the example extractive decoder 408, the example extractive deviation distribution analyzer 410, and the example anomaly detector 412.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, a PCI express interface, an I2C bus, and/or a control area network (CAN) bus.

In the illustrated example, one or more input devices 1222 are connected to the interface circuit 1220. Some input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system. In example disclosed herein, the sensors 202, 204, 206, 304 of FIGS. 2 and 3 are input devices that provide collected sensor data (Ii(x,y,t)) to the example autonomous driving apparatus 300 and/or the example anomaly detection apparatus 306 via the interface circuit 1220.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

Machine executable instructions 1232 representative of the machine executable instruction of FIG. 11 may be stored in the mass storage device 1228, in the volatile memory 1214, in the non-volatile memory 1216, and/or on a removable non-transitory computer-readable storage medium such as a CD or DVD.

From the foregoing, it will be appreciated that example methods, apparatus and articles of manufacture have been disclosed that perform unsupervised multimodal anomaly detection for autonomous vehicles. Examples disclosed herein may employ redundant heterogeneous sensor configurations to implement high-dimensional feature fusion that works independent of the types of sensors and/or independent of specific data formats by using unsupervised machine learning. That is, unsupervised multimodal anomaly detection techniques for autonomous vehicles disclosed herein are not limited to use with particular types of sensors or particular types of data structure for representing environmental characteristics. This increases the flexibility of a computer in an autonomous vehicle by enabling the autonomous vehicle computer to implement autonomous operation of the vehicle based on different types of sensors. This is advantageous over prior techniques designed for analyzing sensor data from homogeneous sensor type configurations (configurations of multiple sensors of the same type), specific quantities of sensors and actuators, specific signal structures, and specific routines that are specifically developed for a particular task and environment. Examples disclosed herein may be flexibly implemented across heterogeneous sensor configurations in which the quantity of sensors can vary over time. For example, one or more sensors may drop out or malfunction over time in an autonomous vehicle. In such situations, examples disclosed herein increase the flexibility and robustness of an autonomous vehicle computer by making the autonomous vehicle computer sufficiently unaffected by such changes in sensor operation. For example, by virtue of recognizing such changes as anomalous and taking such anomalous activity into account, the autonomous vehicle computer can refrain from producing unexpected or abnormal operation of the autonomous vehicle that is inconsistent with the actual environmental conditions in which the autonomous vehicle is operating. The disclosed methods, apparatus and articles of manufacture are accordingly directed to one or more improvement(s) in the functioning of a computer.

While example unsupervised multimodal anomaly detection examples disclosed herein are mostly described with respect to autonomous vehicles, examples disclosed herein can be used in many other non-vehicle applications as well. For example, examples disclosed herein may be used with multiple types of sensors in many applications such as to monitor a manufacturing line, to detect and identify people at an airport, and/or any other situation where different types of sensors are used together.

The following pertain to further examples disclosed herein.

Example 1 is an apparatus to detect an anomaly based on heterogeneous sensor data of an autonomous vehicle. The apparatus of Example 1 includes a sensor data interface to obtain first collected sensor data from a first sensor and second collected sensor data from a second sensor, the first sensor of a first sensor type different than a second sensor type of the second sensor; a multimodal encoder to generate first encoded sensor data based on the first collected sensor data and second encoded sensor data based on the second collected sensor data; a dimensionally interleaving encoder to generate a contextual fused sensor data representation of the first and second collected sensor data based on the first and second encoded sensor data; an extractive decoder to generate first reconstructed sensor data and second reconstructed sensor data based on the contextual fused sensor data representation; an extractive deviation distribution analyzer to determine a deviation estimation based on the first reconstructed sensor data and the second reconstructed sensor data, the deviation estimation representative of a deviation between: (a) the first reconstructed sensor data, and (b) the first collected sensor data from the first sensor; and an anomaly detector to detect an anomaly in the deviation estimation, the anomaly indicative of an error associated with the first sensor.

In Example 2, the subject matter of Example 1 can optionally include that the first sensor is a visible light camera and the second sensor is a Light Detection and Ranging (LIDAR) sensor.

In Example 3, the subject matter of any one of Examples 1-2 can optionally include that the anomaly detector is further to determine confidence scores representative of confidence levels of reliabilities of the first and second collected sensor data.

In Example 4, the subject matter of any one of Examples 1-3 can optionally include that the anomaly detector is to generate an anomaly notification based on the detected anomaly, the anomaly notification to include at least one of: (a) an identifier of the first collected sensor data, (b) a sensor identifier of the first sensor, or (c) a confidence score representative of a confidence level of reliability corresponding to the first sensor.

In Example 5, the subject matter of any one of Examples 1-4 can optionally include a scene analyzer to adjust operation of the autonomous vehicle based on the detected anomaly.

In Example 6, the subject matter of any one of Examples 1-5 can optionally include that the scene analyzer is to adjust operation of the autonomous vehicle by replacing the first collected sensor data with the second collected sensor data.

In Example 7, the subject matter of any one of Examples 1-6 can optionally include that the scene analyzer is to select the second collected sensor data to replace the first collected sensor data based on a confidence score representative of a confidence level of reliability corresponding to the second sensor.

In Example 8, the subject matter of any one of Examples 1-7 can optionally include that the anomaly detector is to detect the anomaly in the deviation estimation based on a threshold being satisfied by the deviation between: (a) the first reconstructed sensor data, and (b) the first collected sensor data from the first sensor.

In Example 9, the subject matter of any one of Examples 1-8 can optionally include an aggregator to generate a contextually aggregated sensor data representation based on the first and second encoded sensor data, the dimensionally interleaving encoder to generate the contextual fused sensor data representation based on the first and second encoded sensor data as represented in the contextually aggregated sensor data representation.

In Example 10, the subject matter of any one of Examples 1-9 can optionally include that the first collected sensor data and the second collected sensor data are of a multi-dimensional format.

Example 11 is a non-transitory computer-readable storage medium comprising instructions that, when executed, cause at least one processor to at least: obtain first collected sensor data from a first sensor and second collected sensor data from a second sensor, the first sensor of a first sensor type different than a second sensor type of the second sensor; generate first encoded sensor data based on the first collected sensor data and second encoded sensor data based on the second collected sensor data; generate a contextual fused sensor data representation of the first and second collected sensor data based on the first and second encoded sensor data; generate first reconstructed sensor data and second reconstructed sensor data based on the contextual fused sensor data representation; determine a deviation estimation based on the first reconstructed sensor data and the second reconstructed sensor data, the deviation estimation representative of a deviation between: (a) the first reconstructed sensor data, and (b) the first collected sensor data from the first sensor; and detect an anomaly in the deviation estimation, the anomaly indicative of an error associated with the first sensor.

In Example 12, the subject matter of Example 11 can optionally include that the first sensor is a visible light camera and the second sensor is a Light Detection and Ranging (LIDAR) sensor.

In Example 13, the subject matter of any one of Examples 11-12 can optionally include that the instructions are further to cause the at least one processor to determine confidence scores representative of confidence levels of reliabilities of the first and second collected sensor data.

In Example 14, the subject matter of any one of Examples 11-13 can optionally include that the instructions are further to cause the at least one processor to generate an anomaly notification based on the detected anomaly, the anomaly notification to include at least one of: (a) an identifier of the first collected sensor data, (b) a sensor identifier of the first sensor, or (c) a confidence score representative of a confidence level of reliability corresponding to the first sensor.

In Example 15, the subject matter of any one of Examples 11-14 can optionally include that the instructions are further to cause the at least one processor to adjust operation of an autonomous vehicle based on the detected anomaly.

In Example 16, the subject matter of any one of Examples 11-15 can optionally include that the instructions are to cause the at least one processor to adjust operation of the autonomous vehicle by replacing the first collected sensor data with the second collected sensor data.

In Example 17, the subject matter of any one of Examples 11-16 can optionally include that the instructions are to cause the at least one processor to select the second collected sensor data to replace the first collected sensor data based on a confidence score representative of a confidence level of reliability corresponding to the second sensor.

In Example 18, the subject matter of any one of Examples 11-17 can optionally include that the instructions are to cause the at least one processor to detect the anomaly in the deviation estimation based on a threshold being satisfied by the deviation between: (a) the first reconstructed sensor data, and (b) the first collected sensor data from the first sensor.

In Example 19, the subject matter of any one of Examples 11-18 can optionally include that the instructions are further to cause the at least one processor to generate a contextually aggregated sensor data representation based on the first and second encoded sensor data, the contextual fused sensor data representation generated based on the first and second encoded sensor data as represented in the contextually aggregated sensor data representation.

In Example 20, the subject matter of any one of Examples 11-19 can optionally include that the first collected sensor data and the second collected sensor data are of a multi-dimensional format.

Example 21 is a method to detect an anomaly based on heterogeneous sensor data of an autonomous vehicle. The method of Example 21 includes obtaining first collected sensor data from a first sensor and second collected sensor data from a second sensor, the first sensor of a first sensor type different than a second sensor type of the second sensor; generating, by executing an instruction with a processor, first encoded sensor data based on the first collected sensor data and second encoded sensor data based on the second collected sensor data; generating, by executing an instruction with the processor, a contextual fused sensor data representation of the first and second collected sensor data based on the first and second encoded sensor data; generating, by executing an instruction with the processor, first reconstructed sensor data and second reconstructed sensor data based on the contextual fused sensor data representation; determining, by executing an instruction with the processor, a deviation estimation based on the first reconstructed sensor data and the second reconstructed sensor data, the deviation estimation representative of a deviation between: (a) the first reconstructed sensor data, and (b) the first collected sensor data from the first sensor; and detecting, by executing an instruction with the processor, an anomaly in the deviation estimation, the anomaly indicative of an error associated with the first sensor.

In Example 22, the subject matter of Example 21 can optionally include that the first sensor is a visible light camera and the second sensor is a Light Detection and Ranging (LIDAR) sensor.

In Example 23, the subject matter of any one of Examples 21-22 can optionally include determining confidence scores representative of confidence levels of reliabilities of the first and second collected sensor data.

In Example 24, the subject matter of any one of Examples 21-23 can optionally include generating an anomaly notification based on the detected anomaly, the anomaly notification to include at least one of: (a) an identifier of the first collected sensor data, (b) a sensor identifier of the first sensor, or (c) a confidence score representative of a confidence level of reliability corresponding to the first sensor.

In Example 25, the subject matter of any one of Examples 21-24 can optionally include adjusting operation of the autonomous vehicle based on the detected anomaly.

In Example 26, the subject matter of any one of Examples 21-25 can optionally include that the adjusting of the operation of the autonomous vehicle includes replacing the first collected sensor data with the second collected sensor data.

In Example 27, the subject matter of any one of Examples 21-26 can optionally include selecting the second collected sensor data to replace the first collected sensor data based on a confidence score representative of a confidence level of reliability corresponding to the second sensor.

In Example 28, the subject matter of any one of Examples 21-27 can optionally include that the detecting of the anomaly in the deviation estimation is based on a threshold being satisfied by the deviation between: (a) the first reconstructed sensor data, and (b) the first collected sensor data from the first sensor.

In Example 29, the subject matter of any one of Examples 21-28 can optionally include generating a contextually aggregated sensor data representation based on the first and second encoded sensor data, the contextual fused sensor data representation generated based on the first and second encoded sensor data as represented in the contextually aggregated sensor data representation.

In Example 30, the subject matter of any one of Examples 21-29 can optionally include that the first collected sensor data and the second collected sensor data are of a multi-dimensional format.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to detect an anomaly based on heterogeneous sensor data of an autonomous vehicle, the apparatus comprising:
    a sensor data interface to obtain first collected sensor data from a first sensor and second collected sensor data from a second sensor, the first sensor different than the second sensor;
    a multimodal encoder to generate first encoded sensor data based on the first collected sensor data and second encoded sensor data based on the second collected sensor data;
    an aggregator to generate a contextually aggregated sensor data representation based on the first and second encoded sensor data;
    a dimensionally interleaving encoder to generate a contextual fused sensor data representation of the first and second collected sensor data based on the first and second encoded sensor data as represented in the contextually aggregated sensor data representation;
    an extractive decoder to generate first reconstructed sensor data and second reconstructed sensor data based on the contextual fused sensor data representation;
    an extractive deviation distribution analyzer to determine a deviation estimation based on the first reconstructed sensor data and the second reconstructed sensor data, the deviation estimation representative of a deviation between: (a) the first reconstructed sensor data, and (b) the first collected sensor data from the first sensor; and
    an anomaly detector to detect the anomaly in the deviation estimation based on a threshold being satisfied by the deviation between: (a) the first reconstructed sensor data, and (b) the first collected sensor data from the first sensor, the anomaly indicative of an error associated with the first sensor.

2. The apparatus as defined in claim 1, wherein the first sensor is a visible light camera and the second sensor is a Light Detection and Ranging (LIDAR) sensor.

3. The apparatus as defined in claim 1, wherein the anomaly detector is further to determine confidence scores representative of confidence levels of reliabilities of the first and second collected sensor data.

4. The apparatus as defined in claim 1, wherein the anomaly detector is to generate an anomaly notification based on the detected anomaly, the anomaly notification to include at least one of: (a) an identifier of the first collected sensor data, (b) a sensor identifier of the first sensor, or (c)

a confidence score representative of a confidence level of reliability corresponding to the first sensor.

5. The apparatus as defined in claim 1, further including a scene analyzer to adjust operation of the autonomous vehicle based on the detected anomaly.

6. The apparatus as defined in claim 5, wherein the scene analyzer is to adjust the operation of the autonomous vehicle by replacing the first collected sensor data with the second collected sensor data.

7. The apparatus as defined in claim 6, wherein the scene analyzer is to select the second collected sensor data to replace the first collected sensor data based on a confidence score representative of a confidence level of reliability corresponding to the second sensor.

8. The apparatus as defined in claim 1, wherein the first collected sensor data and the second collected sensor data are of a multi-dimensional format.

9. A non-transitory computer-readable storage medium comprising instructions that, when executed, cause at least one processor to at least:
 obtain first collected sensor data from a first sensor and second collected sensor data from a second sensor, the first sensor different than the second sensor;
 generate first encoded sensor data based on the first collected sensor data and second encoded sensor data based on the second collected sensor data;
 generate a contextually aggregated sensor data representation based on the first and second encoded sensor data;
 generate a contextual fused sensor data representation of the first and second collected sensor data based on the first and second encoded sensor data as represented in the contextually aggregated sensor data representation;
 generate first reconstructed sensor data and second reconstructed sensor data based on the contextual fused sensor data representation;
 determine a deviation estimation based on the first reconstructed sensor data and the second reconstructed sensor data, the deviation estimation representative of a deviation between: (a) the first reconstructed sensor data, and (b) the first collected sensor data from the first sensor; and
 detect an anomaly in the deviation estimation based on a threshold being satisfied by the deviation between: (a) the first reconstructed sensor data, and (b) the first collected sensor data from the first sensor, the anomaly indicative of an error associated with the first sensor.

10. The non-transitory computer-readable storage medium as defined in claim 9, wherein the instructions are further to cause the at least one processor to determine confidence scores representative of confidence levels of reliabilities of the first and second collected sensor data.

11. The non-transitory computer-readable storage medium as defined in claim 9, wherein the instructions are further to cause the at least one processor to generate an anomaly notification based on the detected anomaly, the anomaly notification to include at least one of: (a) an identifier of the first collected sensor data, (b) a sensor identifier of the first sensor, or (c) a confidence score representative of a confidence level of reliability corresponding to the first sensor.

12. The non-transitory computer-readable storage medium as defined in claim 9, wherein the instructions are further to cause the at least one processor to adjust operation of an autonomous vehicle based on the detected anomaly.

13. The non-transitory computer-readable storage medium as defined in claim 12, wherein the instructions are to cause the at least one processor to adjust the operation of the autonomous vehicle by replacing the first collected sensor data with the second collected sensor data.

14. The non-transitory computer-readable storage medium as defined in claim 13, wherein the instructions are to cause the at least one processor to select the second collected sensor data to replace the first collected sensor data based on a confidence score representative of a confidence level of reliability corresponding to the second sensor.

15. The non-transitory computer-readable storage medium as defined in claim 9, wherein the first sensor is a visible light camera and the second sensor is a Light Detection and Ranging (LIDAR) sensor.

16. The non-transitory computer-readable storage medium as defined in claim 9, wherein the first collected sensor data and the second collected sensor data are of a multi-dimensional format.

17. A method to detect an anomaly based on heterogeneous sensor data of an autonomous vehicle, the method comprising:
 obtaining first collected sensor data from a first sensor and second collected sensor data from a second sensor, the first sensor different than the second sensor;
 generating, by executing an instruction with a processor, first encoded sensor data based on the first collected sensor data and second encoded sensor data based on the second collected sensor data;
 generating, by executing an instruction with the processor, a contextually aggregated sensor data representation based on the first and second encoded sensor data;
 generating, by executing an instruction with the processor, a contextual fused sensor data representation of the first and second collected sensor data based on the first and second encoded sensor data as represented in the contextually aggregated sensor data representation;
 generating, by executing an instruction with the processor, first reconstructed sensor data and second reconstructed sensor data based on the contextual fused sensor data representation;
 determining, by executing an instruction with the processor, a deviation estimation based on the first reconstructed sensor data and the second reconstructed sensor data, the deviation estimation representative of a deviation between: (a) the first reconstructed sensor data, and (b) the first collected sensor data from the first sensor; and
 detecting, by executing an instruction with the processor, the anomaly in the deviation estimation based on a threshold being satisfied by the deviation between: (a) the first reconstructed sensor data, and (b) the first collected sensor data from the first sensor, the anomaly indicative of an error associated with the first sensor.

18. The method as defined in claim 17, further including determining confidence scores representative of confidence levels of reliabilities of the first and second collected sensor data.

19. The method as defined in claim 17, further including generating an anomaly notification based on the detected anomaly, the anomaly notification to include at least one of: (a) an identifier of the first collected sensor data, (b) a sensor identifier of the first sensor, or (c) a confidence score representative of a confidence level of reliability corresponding to the first sensor.

20. The method as defined in claim 17, further including adjusting operation of the autonomous vehicle based on the detected anomaly.

21. The method as defined in claim 20, wherein the adjusting of the operation of the autonomous vehicle includes replacing the first collected sensor data with the second collected sensor data.

22. The method as defined in claim 21, further including selecting the second collected sensor data to replace the first collected sensor data based on a confidence score representative of a confidence level of reliability corresponding to the second sensor.

23. The method as defined in claim 17, wherein the first collected sensor data and the second collected sensor data are of a multi-dimensional format.

24. The method as defined in claim 17, wherein the first sensor is a visible light camera and the second sensor is a Light Detection and Ranging (LIDAR) sensor.

* * * * *